United States Patent
Kwak et al.

(10) Patent No.: US 12,262,245 B2
(45) Date of Patent: Mar. 25, 2025

(54) SELECTIVE RETRANSMISSIONS ON A NON-ORTHOGONAL CHANNEL

(71) Applicant: QUALCOMM Incorporated, San Diego, CA (US)

(72) Inventors: Yongjun Kwak, San Diego, CA (US); Pinar Sen, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 352 days.

(21) Appl. No.: 17/853,784

(22) Filed: Jun. 29, 2022

(65) Prior Publication Data

US 2024/0008040 A1   Jan. 4, 2024

(51) Int. Cl.
*H04L 1/08* (2006.01)
*H04L 1/1607* (2023.01)
(Continued)

(52) U.S. Cl.
CPC .............. *H04W 28/04* (2013.01); *H04L 1/08* (2013.01); *H04L 1/1614* (2013.01); *H04L 1/1835* (2013.01); *H04L 1/1848* (2013.01); *H04L 1/1861* (2013.01); *H04L 1/1874* (2013.01); *H04L 1/188* (2013.01); *H04L 1/1893* (2013.01); *H04L 5/0048* (2013.01);
(Continued)

(58) Field of Classification Search
CPC . H04J 11/0023–0093; H04J 2011/0003–0096; H04L 1/0001–248; H04L 5/0001–26; H04W 28/02–26; H04W 48/02–20; H04W 72/02–569; H04W 74/002–0891; H04W 84/02–16; H04W 88/02–12; H04W 92/02–04; H04W 92/10
See application file for complete search history.

(56) References Cited

U.S. PATENT DOCUMENTS

| 11,063,705 B2 | 7/2021 | Chou |
| 2021/0100002 A1* | 4/2021 | Pan ...................... H04L 1/1614 |
| 2021/0212114 A1* | 7/2021 | Chen .................... H04W 28/02 |

FOREIGN PATENT DOCUMENTS

| WO | 2018021819 A1 | 2/2018 |
| WO | WO-2018064582 A1 * | 4/2018 ............ H04W 28/04 |

(Continued)

OTHER PUBLICATIONS

International Search Report and Written Opinion—PCT/US2023/023399—ISA/EPO—Sep. 21, 2023.

*Primary Examiner* — Timothy J Weidner
(74) *Attorney, Agent, or Firm* — Loza & Loza, LLP

(57) ABSTRACT

An apparatus for wireless communication is provided. The apparatus may be a network node. The apparatus receives a set of uplink transmissions from a set of user equipments (UEs) via a first resource of a non-orthogonal channel, wherein the apparatus is unable to decode the set of uplink transmissions. The apparatus transmits a retransmission request to a subset of the set of UEs. The apparatus receives a retransmission of a first uplink transmission in the set of uplink transmissions via a second resource of the non-orthogonal channel in response to the retransmission request. The apparatus decodes a second uplink transmission in the set of uplink transmissions based on at least the retransmission of the first uplink transmission.

28 Claims, 21 Drawing Sheets

(51) Int. Cl.
*H04L 1/1829* (2023.01)
*H04L 1/1867* (2023.01)
*H04L 5/00* (2006.01)
*H04W 28/04* (2009.01)
*H04W 72/20* (2023.01)
*H04W 74/00* (2009.01)
*H04W 84/02* (2009.01)
*H04W 88/02* (2009.01)
*H04W 88/08* (2009.01)
*H04W 92/02* (2009.01)
*H04W 92/10* (2009.01)

(52) U.S. Cl.
CPC ........... *H04L 5/0055* (2013.01); *H04W 72/20* (2023.01); *H04W 74/006* (2013.01); *H04W 84/02* (2013.01); *H04W 88/02* (2013.01); *H04W 88/08* (2013.01); *H04W 92/02* (2013.01); *H04W 92/10* (2013.01)

(56) References Cited

FOREIGN PATENT DOCUMENTS

| | | | | |
|---|---|---|---|---|
| WO | WO-2019200589 A1 | * | 10/2019 | ............... H04L 5/00 |
| WO | WO-2020083469 A1 | * | 4/2020 | ........... H04L 1/1835 |

* cited by examiner

SELECTIVE RETRANSMISSIONS ON A NON-ORTHOGONAL CHANNEL

BACKGROUND

Technical Field

The present disclosure relates generally to communication systems, and more particularly, to selective retransmissions on a non-orthogonal channel.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A grant-free non-orthogonal multiple access (NOMA) scheme may be used to support massive connectivity. In a grant-free NOMA scheme, multiple users (e.g., multiple user equipments (UEs)) may transmit data using the same resources (e.g., the same time-frequency resources) without a grant (e.g., a permission to transmit using scheduled resources) from a network (e.g., a base station). The reliability of grant-free NOMA uplink transmissions may vary depending on how many users simultaneously transmit packets. A retransmission scheme (e.g., a hybrid automatic repeat request (HARQ) scheme) may be implemented to improve the reliability of the grant-free NOMA uplink transmissions, however, the management of the retransmissions and the overhead resulting from the retransmissions may impact the performance of the network. The aspects described herein may improve the reliability of grant-free NOMA uplink transmissions while achieving a significant reduction in the number of retransmissions from users.

In an aspect of the disclosure, a method, a computer-readable medium, and an apparatus are provided. The apparatus may be a network node (e.g., a base station). The apparatus receives a set of uplink transmissions from a set of user equipments (UEs) via a first resource of a non-orthogonal channel, wherein the apparatus is unable to decode the set of uplink transmissions. The apparatus transmits a retransmission request to a subset of the set of UEs. The apparatus receives a retransmission of a first uplink transmission in the set of uplink transmissions via a second resource of the non-orthogonal channel in response to the retransmission request. The apparatus decodes a second uplink transmission in the set of uplink transmissions based on at least the retransmission of the first uplink transmission.

In an aspect of the disclosure, a method, a computer-readable medium, and an apparatus are provided. The apparatus may be a UE. The apparatus transmits an uplink transmission using a first resource of a non-orthogonal channel. The apparatus receives a retransmission request for the uplink transmission. The apparatus retransmits the uplink transmission or a portion of the uplink transmission using a second resource of the non-orthogonal channel in response to the retransmission request. The apparatus receives a wait signal in response to the retransmission of the uplink transmission or the portion of the uplink transmission.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
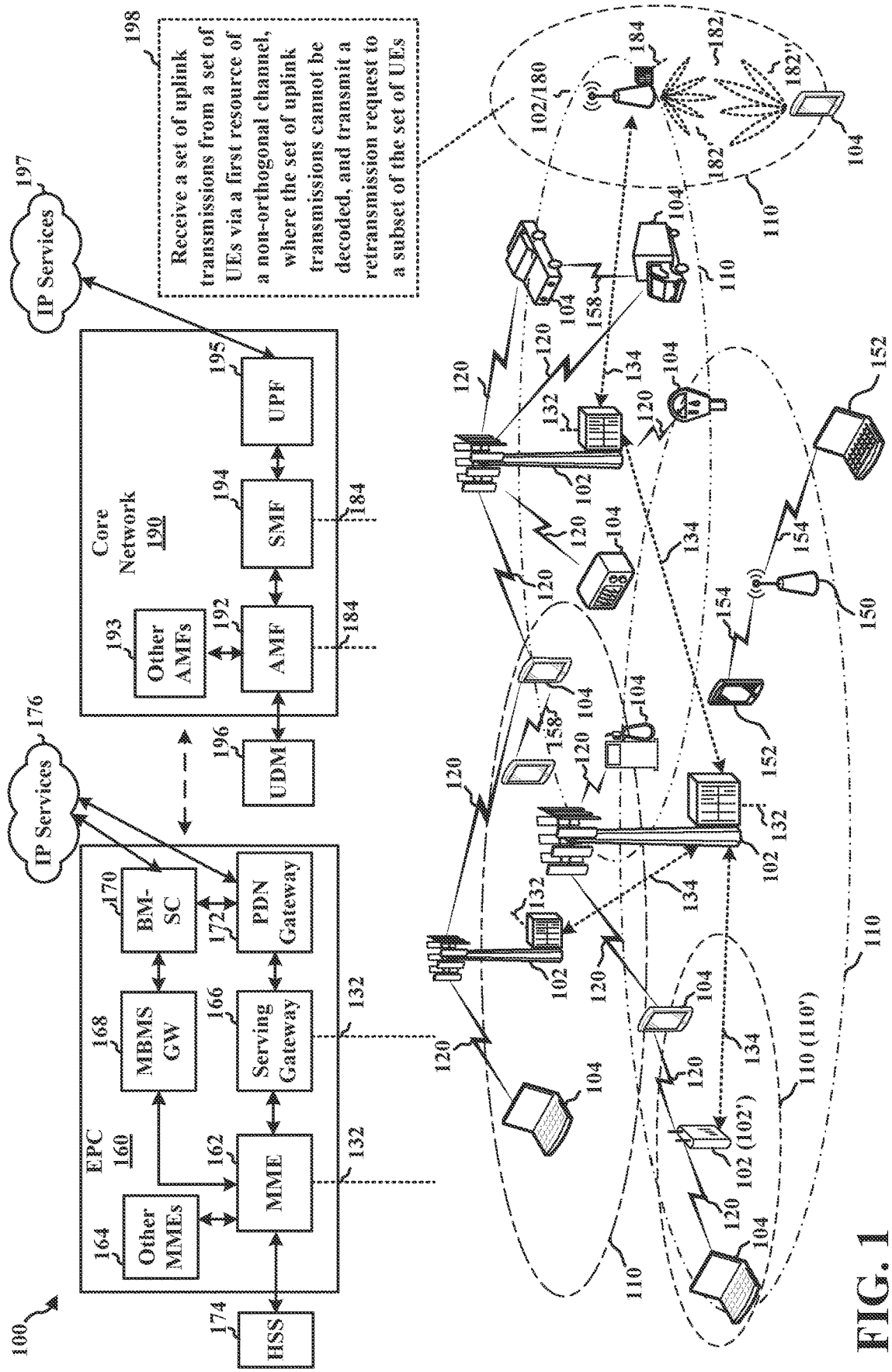
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 180 may be configured to receive a set of uplink transmissions from a set of UEs via a first resource of a non-orthogonal channel, where the set of uplink transmissions cannot be decoded, and transmit a retransmission request to a subset of the set of UEs (198). Although the following description may be focused on 5G NR, the concepts described herein may be applicable to other similar areas, such as 6G, LTE, LTE-A, CDMA, GSM, and other wireless technologies.

Figure 2A:
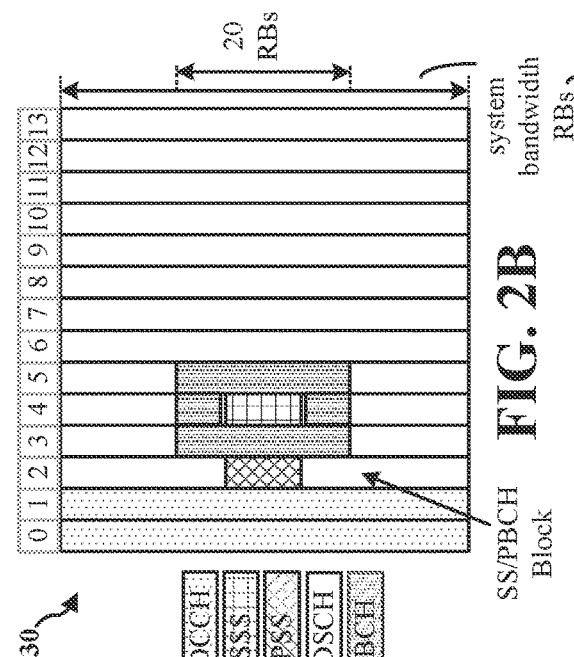
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.
Figure 2B:
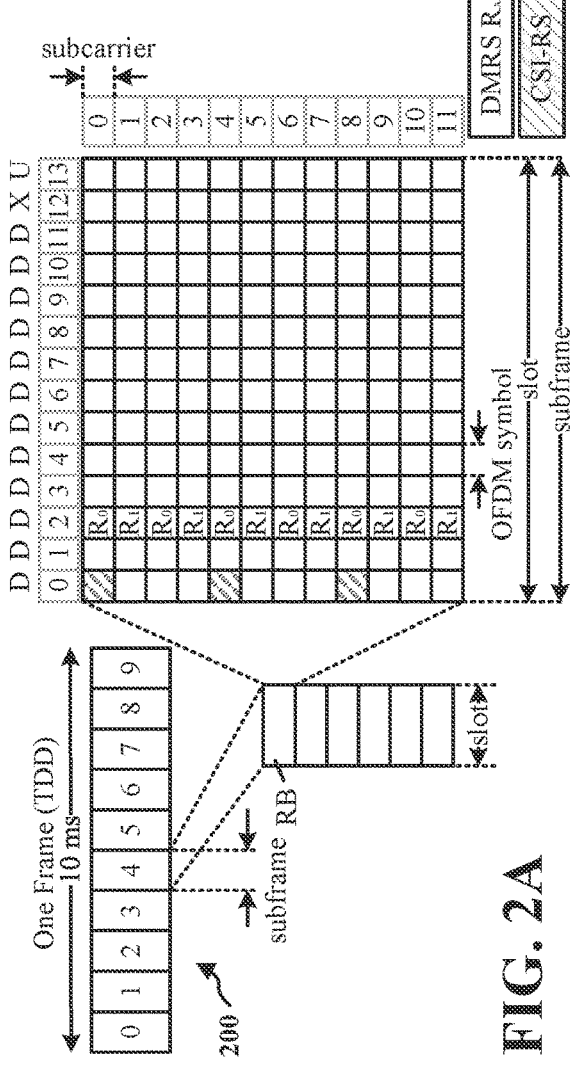
Figure 2C:
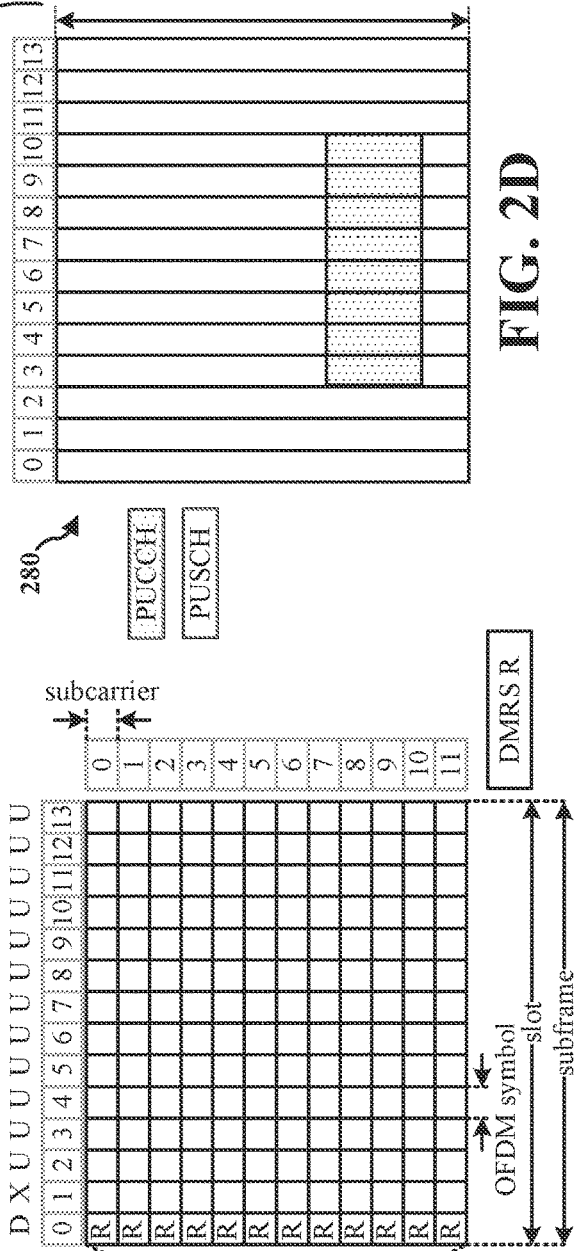
Figure 2D:
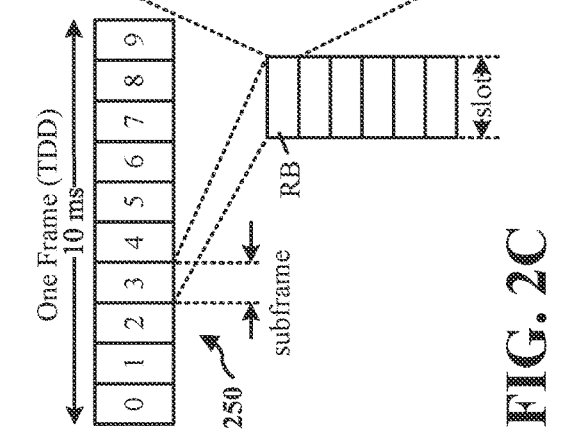

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kKz, where p is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
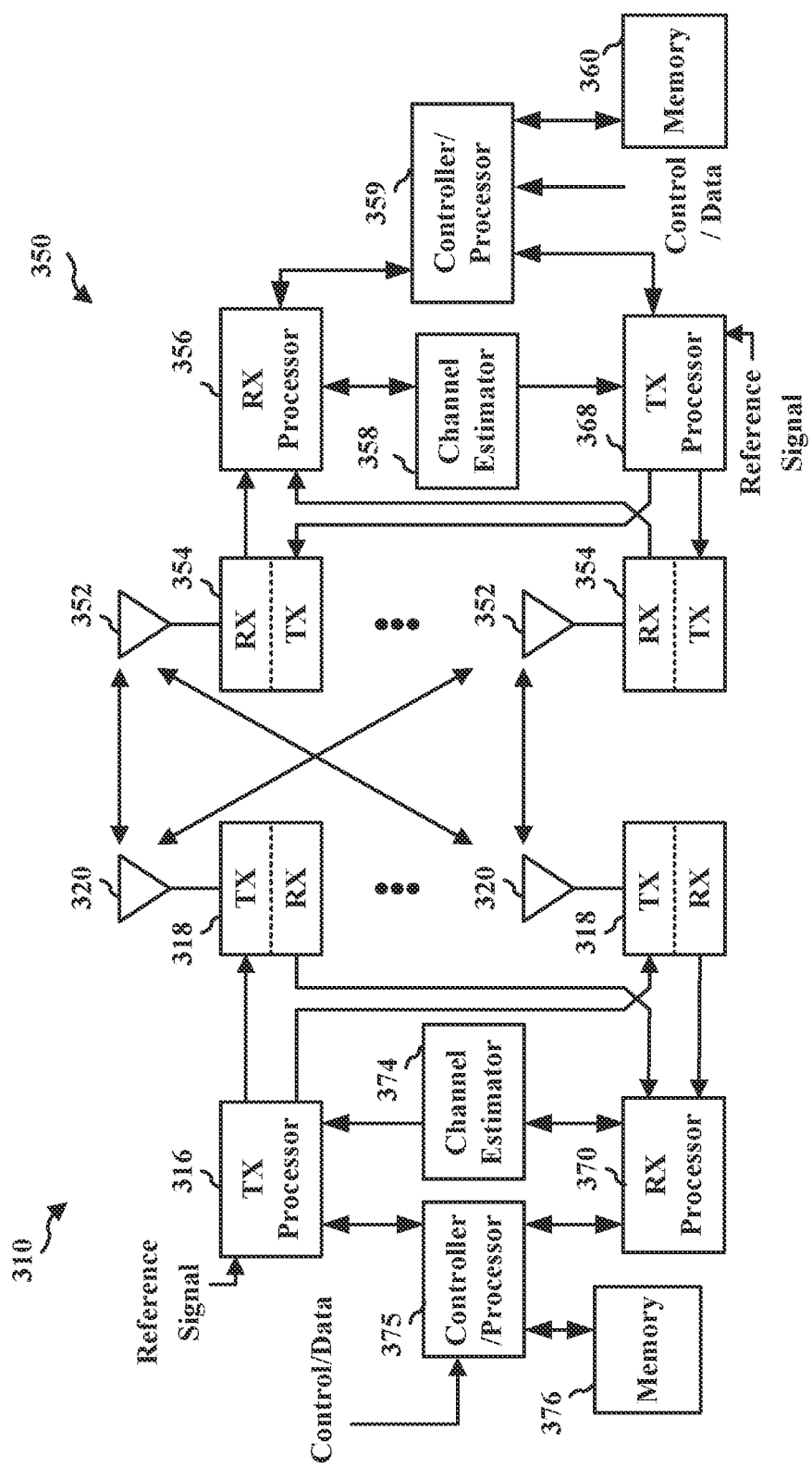
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 316, the RX processor 370, and the controller/processor 375 may be configured to perform aspects in connection with 198 of FIG. 1.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 4:
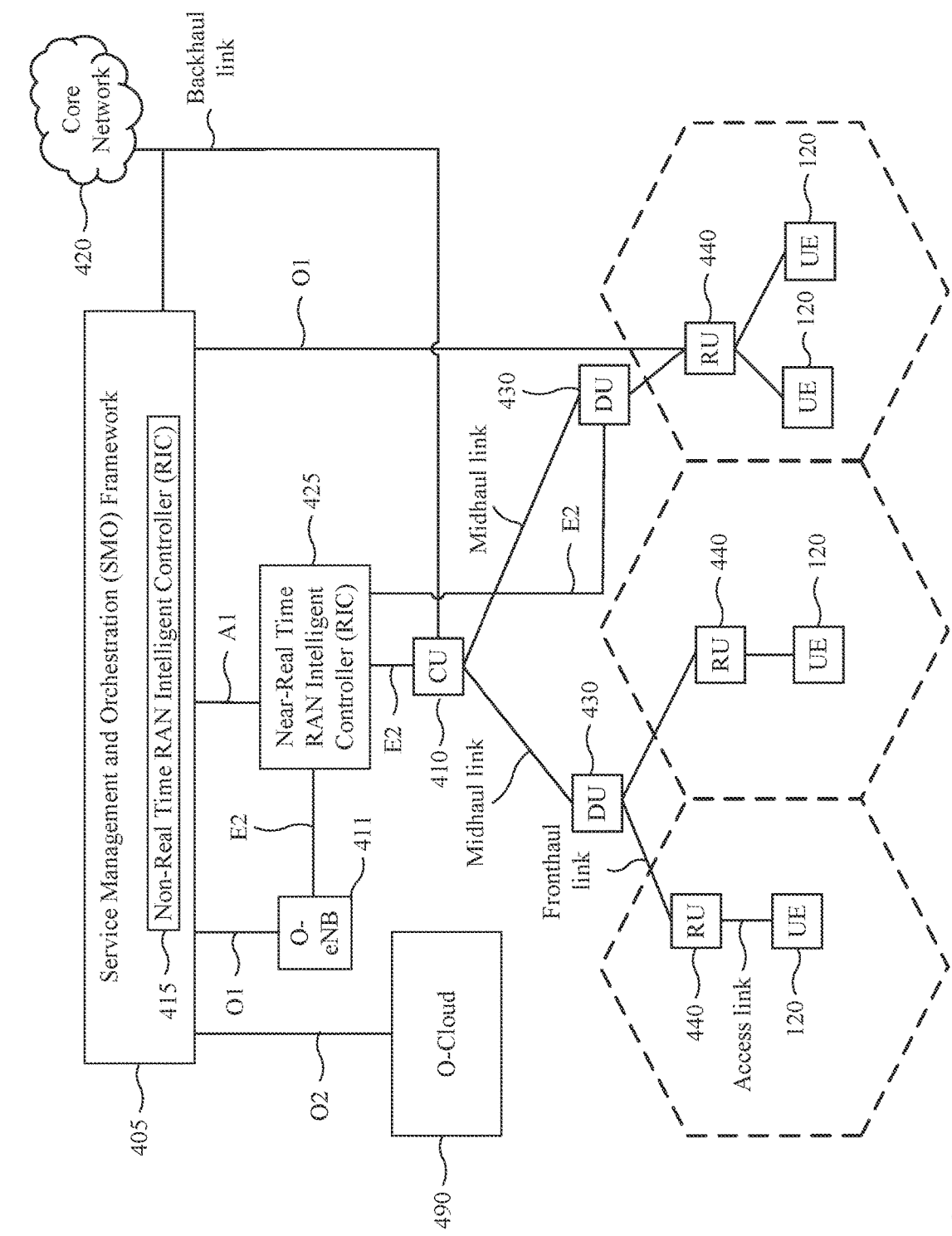
FIG. 4 shows a diagram illustrating an example disaggregated base station architecture.

FIG. 4 shows a diagram illustrating an example disaggregated base station 400 architecture. The disaggregated base station 400 architecture may include one or more central units (CUs) 410 that can communicate directly with a core network 420 via a backhaul link, or indirectly with the core network 420 through one or more disaggregated base station units (such as a Near-Real Time (Near-RT) RAN Intelligent Controller (RIC) 425 via an E2 link, or a Non-Real Time (Non-RT) RIC 415 associated with a Service Management and Orchestration (SMO) Framework 405, or both). A CU 410 may communicate with one or more distributed units (DUs) 430 via respective midhaul links, such as an F1 interface. The DUs 430 may communicate with one or more radio units (RUs) 440 via respective fronthaul links. The RUs 440 may communicate with respective UEs 120 via one or more radio frequency (RF) access links. In some implementations, the UE 120 may be simultaneously served by multiple RUs 440.

Each of the units, i.e., the CUs 410, the DUs 430, the RUs 440, as well as the Near-RT RICs 425, the Non-RT RICs 415 and the SMO Framework 405, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 410 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 410. The CU 410 may be configured to handle user plane functionality (i.e., Central Unit-User Plane (CU-UP)), control plane functionality (i.e., Central Unit-Control Plane (CU-CP)), or a combination thereof. In some implementations, the CU 410 can be logically split into one or more CU-UP units and one or more CU-CP units. The CU-UP unit can communicate bidirectionally with the CU-CP unit via an interface, such as the E1 interface when implemented in an O-RAN configuration. The CU 410 can be implemented to communicate with the DU 430, as necessary, for network control and signaling.

The DU 430 may correspond to a logical unit that includes one or more base station functions to control the operation of one or more RUs 440. In some aspects, the DU 430 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 430 may further host one or more low PHY layers. Each layer (or module) can be implemented with an interface configured to communicate signals with other layers (and modules) hosted by the DU 430, or with the control functions hosted by the CU 410.

Lower-layer functionality can be implemented by one or more RUs 440. In some deployments, an RU 440, controlled by a DU 430, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 440 can be implemented to handle over the air (OTA) communication with one or more UEs 120. In some implementations, real-time and non-real-time aspects of control and user plane communication with the RU(s) 440 can be controlled by the corresponding DU 430. In some scenarios, this configuration can enable the DU(s) 430 and the CU 410 to be implemented in a cloud-based RAN architecture, such as a vRAN architecture.

The SMO Framework 405 may be configured to support RAN deployment and provisioning of non-virtualized and virtualized network elements. For non-virtualized network elements, the SMO Framework 405 may be configured to support the deployment of dedicated physical resources for RAN coverage requirements which may be managed via an operations and maintenance interface (such as an O1 interface). For virtualized network elements, the SMO Framework 405 may be configured to interact with a cloud computing platform (such as an open cloud (O-Cloud) 490) to perform network element life cycle management (such as to instantiate virtualized network elements) via a cloud computing platform interface (such as an O2 interface). Such virtualized network elements can include, but are not limited to, CUs 410, DUs 430, RUs 440 and Near-RT RICs 425. In some implementations, the SMO Framework 405 can communicate with a hardware aspect of a 4G RAN, such as an open eNB (O-eNB) 411, via an O1 interface. Additionally, in some implementations, the SMO Framework 405 can communicate directly with one or more RUs 440 via an O1 interface. The SMO Framework 405 also may include a Non-RT RIC 415 configured to support functionality of the SMO Framework 405.

The Non-RT RIC 415 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 425. The Non-RT RIC 415 may be coupled to or communicate with (such as via an AI interface) the Near-RT RIC 425. The Near-RT RIC 425 may be configured to include a logical function that enables near-real-time control and optimization of RAN elements and resources via data collection and actions over an interface (such as via an E2 interface) connecting one or more CUs 410, one or more DUs 430, or both, as well as an O-eNB, with the Near-RT RIC 425.

In some implementations, to generate AI/ML models to be deployed in the Near-RT RIC 425, the Non-RT RIC 415 may receive parameters or external enrichment information from external servers. Such information may be utilized by the Near-RT RIC 425 and may be received at the SMO Framework 405 or the Non-RT RIC 415 from non-network data sources or from network functions. In some examples, the Non-RT RIC 415 or the Near-RT RIC 425 may be configured to tune RAN behavior or performance. For example, the Non-RT RIC 415 may monitor long-term trends and patterns for performance and employ AI/ML models to perform corrective actions through the SMO Framework 405 (such as reconfiguration via O1) or via creation of RAN management policies (such as A1 policies).

Massive connectivity may provide network access to anywhere from hundreds to billions of wireless communication devices. In some examples, the wireless communication devices may be user equipments (UEs). As previously described, a UE may be an IoT device, such as an industrial sensor device, a utility meter, an in-home network, a wearable device, an asset tracker, a health monitor, a video surveillance unit, etc.

When massive connectivity is implemented in a network (e.g., a 5G NR network), the performance of the wireless communication devices and/or the network may decrease as the connection density for a given area increases. Therefore, a massive connectivity deployment should consider the connection density for a given area. For example, support for a connection density of one million devices per square kilometer may be needed in a 5G NR network. Looking ahead to 6G networks, support for a connection density of 10 million devices per square kilometer may be needed.

A grant-free non-orthogonal multiple access (NOMA) scheme may be used to support massive connectivity. In a grant-free NOMA scheme, multiple users may transmit data using the same resources without a grant (e.g., a permission to transmit using scheduled resources) from the network (e.g., a base station). Therefore, if a UE has data to transmit, it can autonomously transmit the data using a resource of a non-orthogonal multiple access channel (also referred to as a NOMA channel). The resource of a NOMA channel may be preconfigured by a network node (e.g., a base station) and opportunistically used by UEs to transmit data based on data traffic.

For example, massive connectivity may need to support a large connection density, small packet sizes, and bursty traffic with a large inter-arrival time. A grant-free NOMA scheme may support these needs by increasing the multiplexing gain and uplink cell capacity, by providing grant-free operation to reduce control overhead, and/or by providing efficient resource utilization.

A hybrid automatic repeat request (HARQ) mechanism may be used for grant-free NOMA transmissions. For example, if an initial transmission from a UE is a grant-free NOMA transmission, reliability may vary depending on the number of other UEs simultaneously transmitting packets. Therefore, a HARQ mechanism may be implemented to achieve sufficient reliability. The aspects described herein may control retransmissions for initial grant-free NOMA transmissions from UEs.

In some examples, to support grant-free NOMA transmissions from UEs, a network node may be equipped with an advanced receiver capable of interference cancellation. Such an advanced receiver may also benefit HARQ retransmissions.

In some examples, a UE may use a unique multiple access (MA) signature for a grant-free NOMA transmission. For example, if multiple UEs transmit data using the same time-frequency resources associated with a NOMA channel, a network node may differentiate the transmissions from the UEs based on the unique MA signature of each UE. For example, an MA signature may include a UE scrambling sequence, a UE spreading sequence, or other suitable type of signature.

Figure 5:
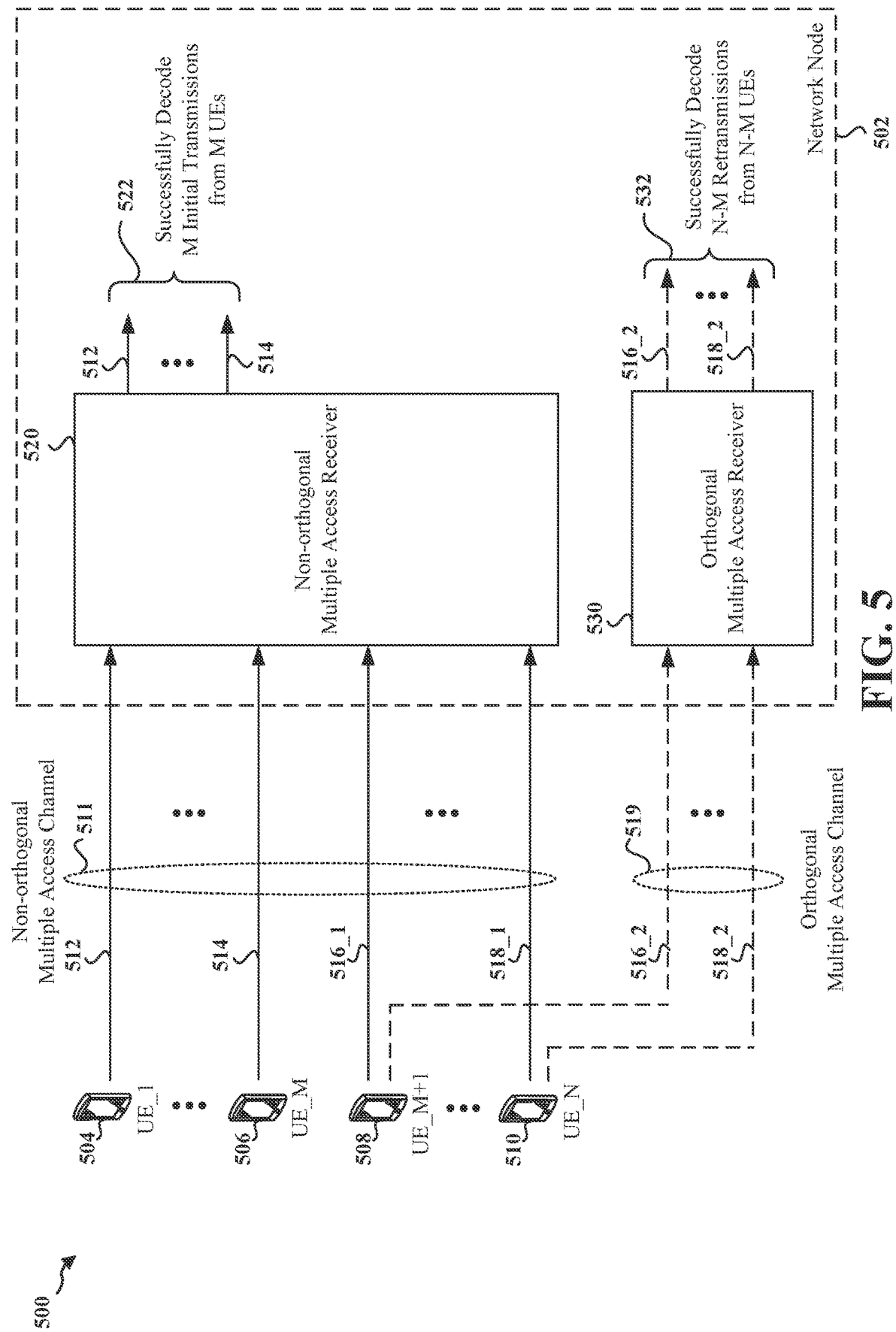
FIG. 5 is a diagram illustrating a hybrid automatic repeat request (HARQ) procedure for non-orthogonal multiple access (NOMA) transmissions.

FIG. 5 is a diagram 500 illustrating a HARQ procedure for NOMA transmissions. FIG. 5 includes a network node 502 and N UEs including UE_1 504, UE_M 506, UE_M+1 508, and UE_N 510. For example, N and M may represent positive integers, where N>M. Each of the N UEs may transmit an initial uplink transmission (e.g., a data transmission) using the same time-frequency resources of a NOMA channel 511. For example, the UE_1 504, UE_M 506, UE_M+1 508, and UE_N 510 may transmit respective initial uplink transmissions 512, 514, 516_1, and 518_1 without a grant from the network node 502. In some examples, the network node 502 may be a base station.

The network node 502 may receive the N initial uplink transmissions from the N UEs at a NOMA receiver 520. In the example of FIG. 5, the NOMA receiver 520 may successfully decode M initial transmissions from M UEs and may fail to decode N−M initial transmissions from N−M UEs. For example, at 522, the NOMA receiver 520 may successfully decode M initial transmissions including the initial uplink transmissions 512, 514. In one example, if N=10 and M=7, the NOMA receiver 520 may successfully decode seven initial transmissions from seven of the N UEs at 522 and may fail to decode three initial transmissions (e.g., N−M=10−7=3) from the remaining three UEs.

The network node 502 may transmit a UL grant to each of the N−M UEs using DCI for a retransmission on an orthogonal multiple access channel 519. Each UL grant may indicate a different time-frequency resource of the orthogonal multiple access channel 519 for each of the N−M UEs. In the example of FIG. 5, the N−M UEs may include UE_M+1 508 and UE_N 510. Each of the N−M UEs may retransmit its uplink transmission using its assigned time-frequency resource of the orthogonal multiple access channel 519. For example, in FIG. 5, the uplink transmission 516_2 represents a retransmission of the initial uplink transmission 516_1, and the uplink transmission 518_2 represents a retransmission of the initial uplink transmission 518_1.

The network node 502 may receive the N−M retransmissions from the N−M UEs at an orthogonal multiple access receiver 530. In the example of FIG. 5, the orthogonal multiple access receiver 530 may successfully decode N−M retransmissions from N−M UEs. For example, at 532, the orthogonal multiple access receiver 530 may successfully decode N−M retransmissions including the retransmissions 516_2, 518_2. In one example, if N=10 and M=7, the orthogonal multiple access receiver 530 may successfully decode three retransmissions (e.g., N−M=10−7=3) from three of the N UEs.

Figure 6:
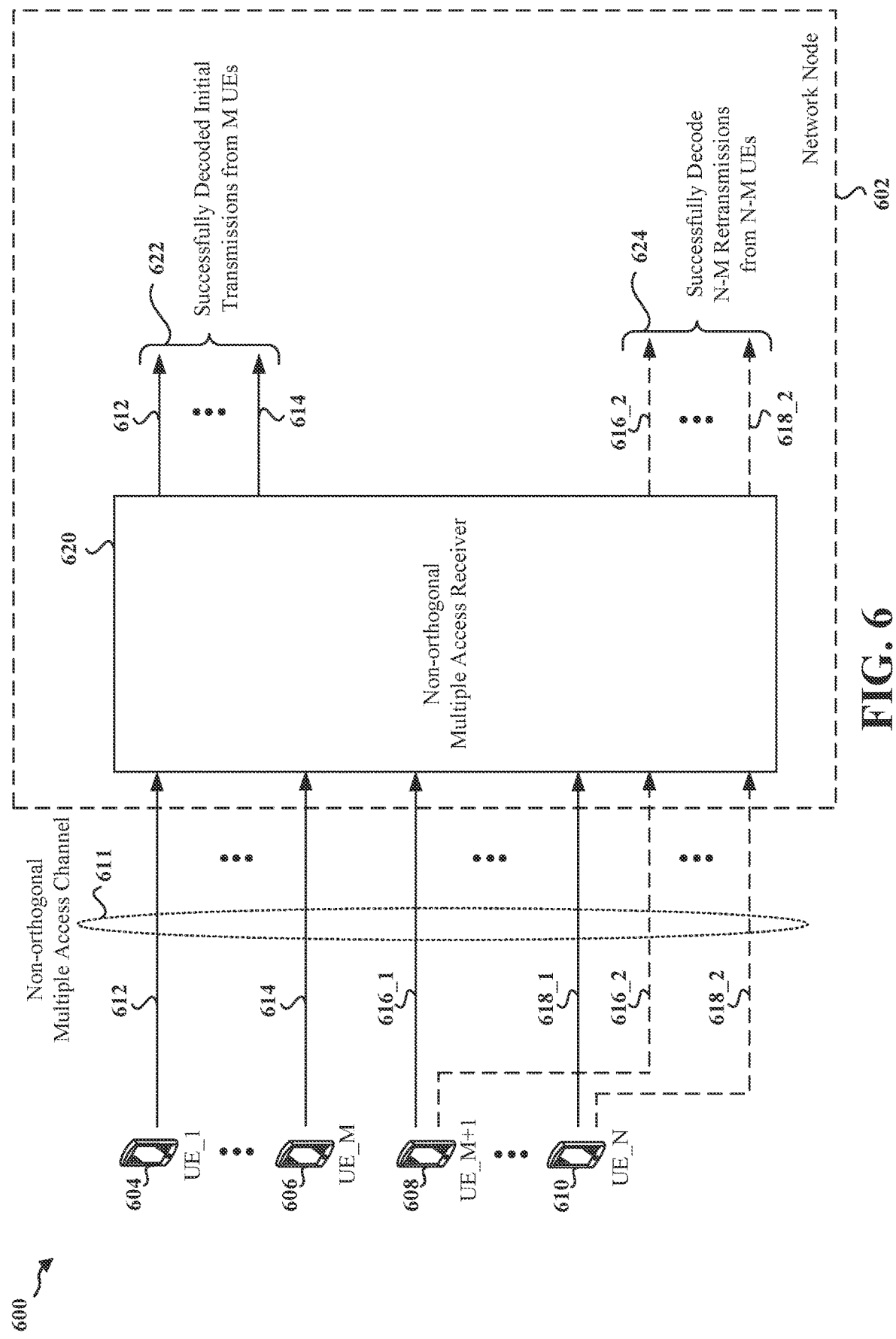
FIG. 6 is a diagram illustrating a HARQ procedure for NOMA transmissions.

FIG. 6 is a diagram 600 illustrating a HARQ procedure for NOMA transmissions. FIG. 6 includes a network node 602 and N UEs including UE_1 604, UE_M 606, UE_M+1 608, and UE_N 610. For example, N and M may represent positive integers, where N>M. Each of the N UEs may transmit an initial uplink transmission (e.g., a data transmission) using the same time-frequency resources of a NOMA channel 611. For example, the UE_1 604, UE_M 606, UE_M+1 608, and UE_N 610 may transmit respective initial uplink transmissions 612, 614, 616_1, and 618_1 without a grant from the network node 602.

The network node 602 may receive the N initial uplink transmissions from the N UEs at a NOMA receiver 620. In the example of FIG. 6, the NOMA receiver 620 may successfully decode M initial transmissions from M UEs and may fail to decode N−M initial transmissions from N−M UEs. For example, at 622, the NOMA receiver 620 may successfully decode M initial transmissions including the initial uplink transmissions 612, 614. In one example, if N=10 and M=7, the NOMA receiver 620 may successfully decode seven initial transmissions from seven of the N UEs at 622 and may fail to decode three initial transmissions (e.g., N−M=10−7=3) from the remaining three UEs.

The network node 602 may transmit a negative acknowledgement (NACK) to the N−M UEs. In the example of FIG. 6, the N−M UEs may include UE_M+1 608 and UE_N 610. Each of the N−M UEs may retransmit its respective initial uplink transmission without a grant from the network node 602 in response to the NACK. For example, in FIG. 6, the uplink transmission 616_2 represents a retransmission of the initial uplink transmission 616_1, and the uplink transmission 618_2 represents a retransmission of the initial uplink transmission 618_1. In some examples, the retransmission of the initial uplink transmission 616_1 and the uplink transmission 618_2 may be based on a synchronized HARQ operation.

The network node 602 may receive the N−M retransmissions from the N−M UEs at the NOMA receiver 620. In the example of FIG. 6, the NOMA receiver 620 may successfully decode N−M retransmissions from N−M UEs. For example, at 624, the NOMA receiver 620 may successfully decode N−M retransmissions including the retransmissions 616_2, 618_2. In one example, if N=10 and M=7, the NOMA receiver 620 may successfully decode three retransmissions (e.g., N−M=10−7=3) from three of the N UEs.

Figure 7:
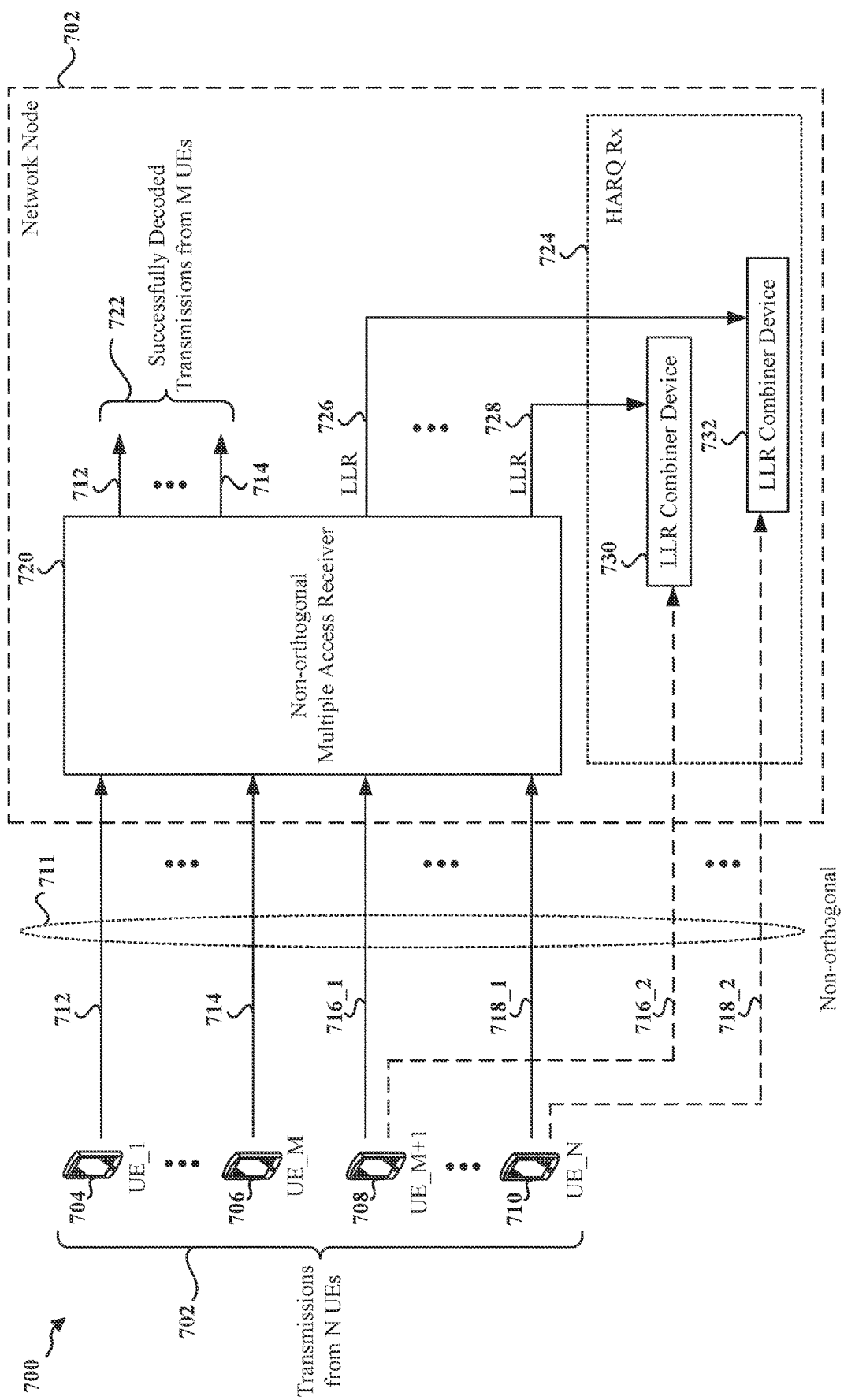
FIG. 7 is a diagram illustrating a HARQ combining procedure for NOMA transmissions.

FIG. 7 is a diagram 700 illustrating a HARQ combining procedure for NOMA transmissions. FIG. 7 includes a network node 702 and N UEs including UE_1 704, UE_M 706, UE_M+1 708, and UE_N 710. For example, N and M may represent positive integers, where N>M. Each of the N UEs may transmit an initial uplink transmission (e.g., a data transmission) using the same time-frequency resources of a NOMA channel 711. For example, the UE_1 704, UE_M 706, UE_M+1 708, and UE_N 710 may transmit respective initial uplink transmissions 712, 714, 716_1, and 718_1 without a grant from the network node 702.

The network node 702 may receive the N initial uplink transmissions from the N UEs at a NOMA receiver 720. In some examples, the NOMA receiver 720 may perform an advanced interference cancellation operation (e.g., minimum mean square error successive interference cancellation (MMSE-SIC) or other suitable type of successive interference cancellation) on the N initial uplink transmissions and may attempt to decode the N initial uplink transmissions. The network node 702 may successfully decode M initial transmissions from M UEs and may fail to decode N−M initial transmissions from N−M UEs.

For example, at 722, the NOMA receiver 720 may successfully decode M initial transmissions including the initial uplink transmissions 712, 714. In one example, if N=10 and M=7, the NOMA receiver 720 may successfully decode seven initial transmissions from seven of the N UEs at 722 and may fail to decode three initial transmissions (e.g., N−M=10−7=3) from the remaining three UEs.

The network node 702 may transmit a NACK to the N−M UEs. In the example of FIG. 7, the N−M UEs may include UE_M+1 708 and UE_N 710. Each of the N−M UEs may retransmit its respective initial uplink transmission without a grant from the network node 702 in response to the NACK. For example, in FIG. 7, the uplink transmission 716_2 represents a retransmission of the initial uplink transmission 716_1, and the uplink transmission 718_2 represents a retransmission of the initial uplink transmission 718_1. In some examples, the retransmission of the initial uplink transmission 716_1 and the uplink transmission 718_2 may be based on a synchronized HARQ operation.

The NOMA receiver 720 may generate and store a log-likelihood ratio (LLR) for each of the N–M retransmissions. For example, the NOMA receiver 720 may generate an LLR value 726 for the initial uplink transmission 716_1 and an LLR value 728 for the initial uplink transmission 718_1. The NOMA receiver 720 may provide each LLR value of the N–M retransmissions to a respective LLR combiner device, such as LLR combiner devices 730, 732, of a HARQ reception mechanism 724. In FIG. 7, it should be noted that the NOMA receiver 720 stores LLR values for the N–M UEs (e.g., UEs to which a NACK is transmitted) and may not store LLR values for the M UEs, which reduce memory consumption at the network node 702.

The network node 702 may provide each of the N–M retransmissions from the N–M UEs to a respective LLR combiner device to successfully decode transmissions from the N–M UEs. For example, the network node 702 may provide the uplink transmission 716_2 to the LLR combiner device 730 and may provide the uplink transmission 718_2 to the LLR combiner device 732. However, the performance of the HARQ combining approach described with reference to FIG. 7 may be inferior to an interference cancellation based reception scheme described with reference to FIG. 8.

Figure 8:
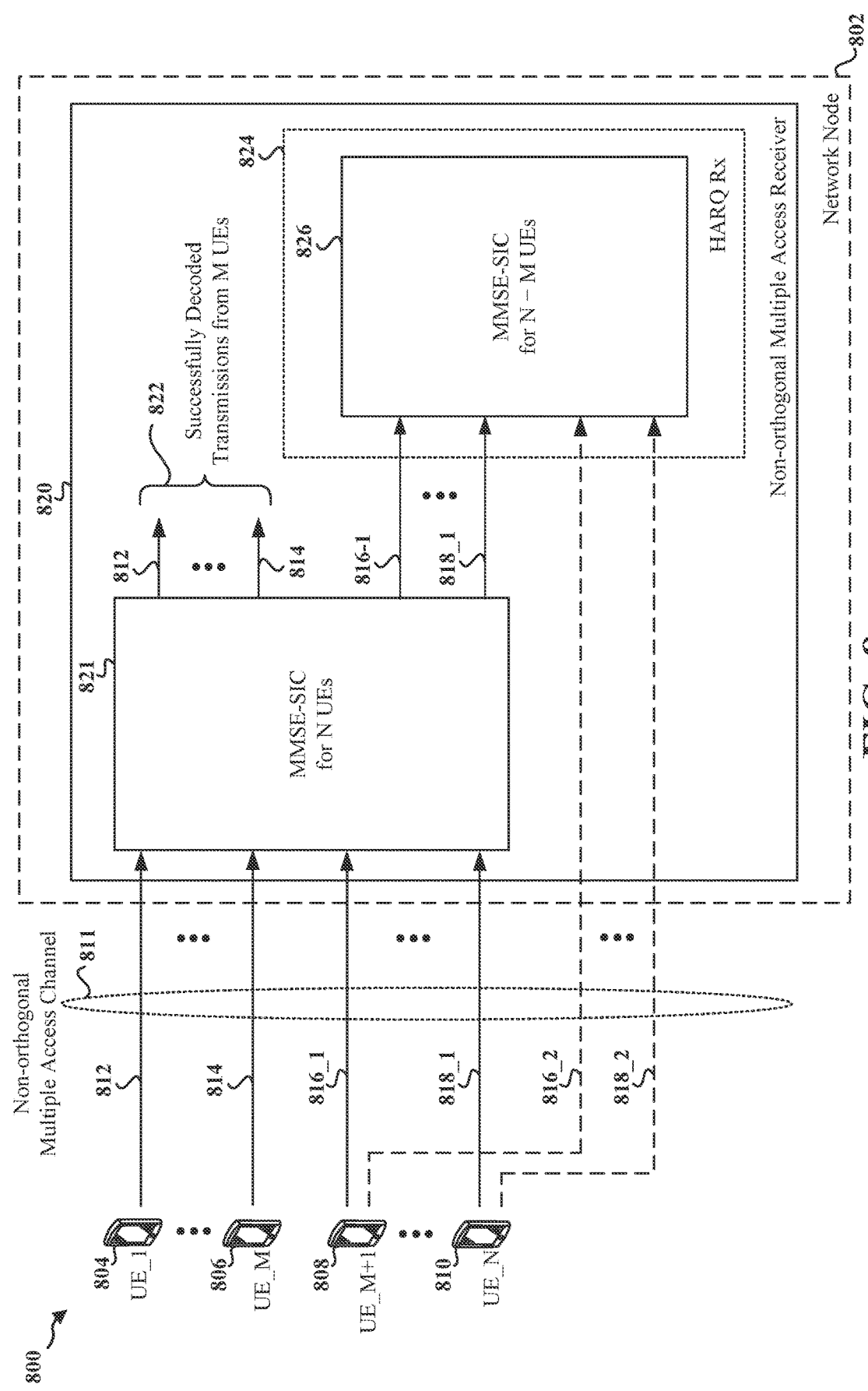
FIG. 8 is a diagram illustrating a HARQ procedure for NOMA transmissions.

FIG. 8 is a diagram 800 illustrating a HARQ procedure for NOMA transmissions. FIG. 8 includes a network node 802 and N UEs including UE_1 804, UE_M 806, UE_M+1 808, and UE_N 810. For example, N and M may represent positive integers, where N>M. Each of the N UEs may transmit an initial uplink transmission (e.g., a data transmission) using the same time-frequency resources of a NOMA channel 811. For example, the UE_1 804, UE_M 806, UE_M+1 808, and UE_N 810 may transmit respective initial uplink transmissions 812, 814, 816_1, and 818_1 without a grant from the network node 802.

The network node 802 may receive the N initial uplink transmissions from the N UEs at a NOMA receiver 820. In some examples, the NOMA receiver 820 may perform an advanced interference cancellation operation (e.g., MMSE-SIC at 821 or other suitable type of successive interference cancellation), on the N initial uplink transmissions and may attempt to decode the N initial uplink transmissions. The NOMA receiver 820 may successfully decode M initial transmissions from M UEs and may fail to decode N–M initial transmissions from N–M UEs.

For example, at 822, the NOMA receiver 820 may successfully decode M initial transmissions including the initial uplink transmissions 812, 814. In one example, if N=10 and M=8, the NOMA receiver 820 may successfully decode seven initial transmissions from seven of the N UEs at 822 and may fail to decode three initial transmissions (e.g., N−M=10−7=3) from the remaining three UEs.

The network node 802 may transmit a NACK to the N–M UEs. In the example of FIG. 8, the N–M UEs may include UE_M+1 808 and UE_N 810. Each of the N–M UEs may retransmit its respective initial uplink transmission without a grant from the network node 802 in response to the NACK. For example, in FIG. 8, the uplink transmission 816_2 represents a retransmission of the initial uplink transmission 816_1, and the uplink transmission 818_2 represents a retransmission of the initial uplink transmission 818_1. In some examples, the retransmission of the initial uplink transmission 816_1 and the uplink transmission 818_2 may be based on a synchronized HARQ operation.

The NOMA receiver 820 may store the N–M initial transmissions (e.g., the initial uplink transmissions 816_1, 818_1) and may perform MMSE-SIC at 826 (or other suitable type of successive interference cancellation) on the N–M initial transmissions and the N–M retransmissions (e.g., the uplink transmissions 816_2, 818_2) from the N–M UEs. The MMSE-SIC at 826 may be a part of a HARQ reception mechanism 824. The NOMA receiver 820 may use a significant amount of memory space to store the N–M initial transmissions (e.g., the channel coefficients of the N–M initial transmissions of the N–M UEs).

Figure 9:
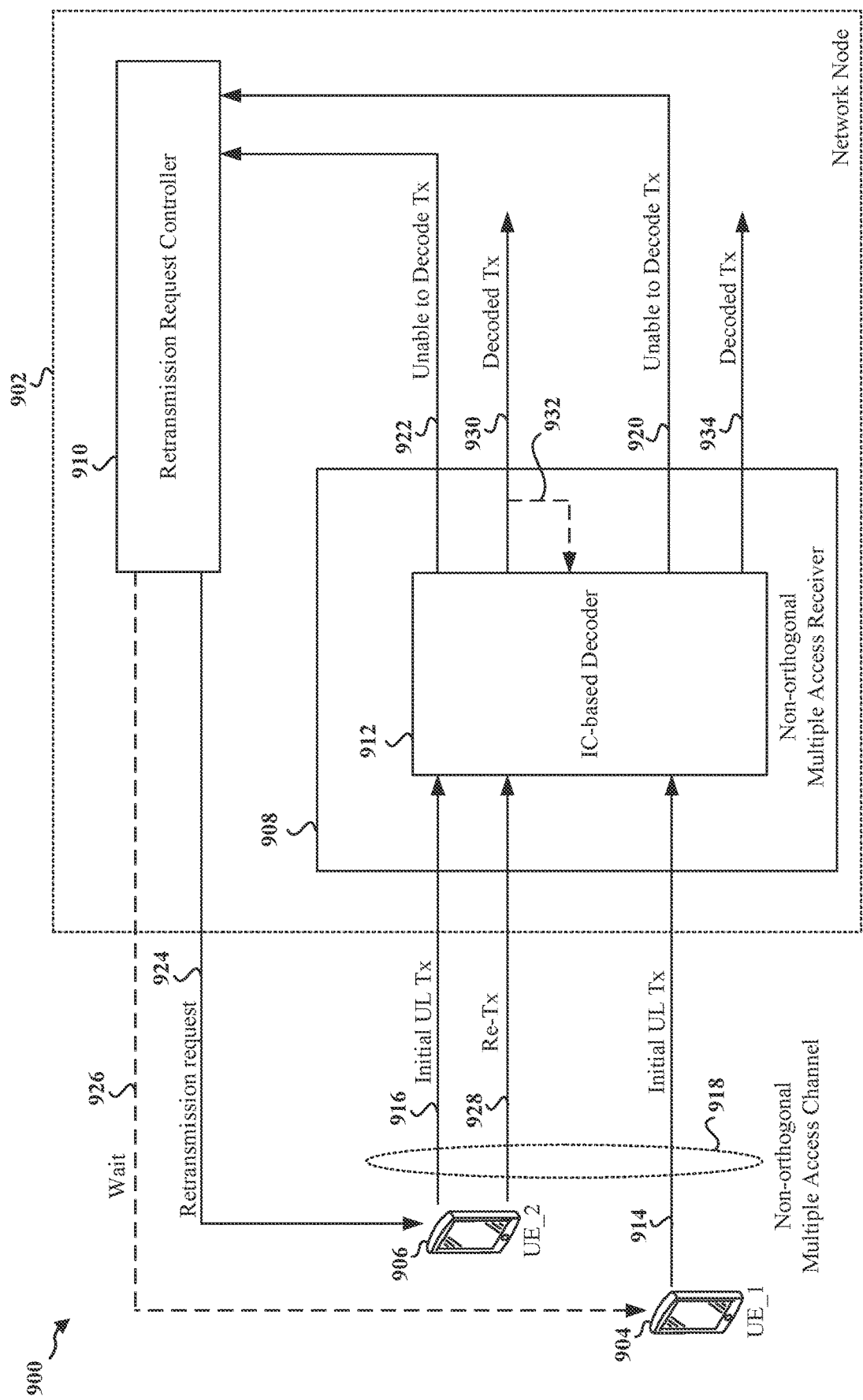
FIG. 9 is a diagram illustrating uplink transmissions on a NOMA channel from a set of UEs and a selective retransmission from a subset of the set of UEs in accordance with various aspects of the disclosure.

FIG. 9 is a diagram 900 illustrating uplink transmissions on a NOMA channel from a set of UEs and a selective retransmission from a subset of the set of UEs in accordance with various aspects of the disclosure. FIG. 9 includes a network node 902, a first UE (UE_1) 904, a second UE (UE_2) 906, a NOMA receiver 908, and a retransmission request controller 910. The NOMA receiver 908 may include an IC-based decoder 912.

The first UE 904 may transmit an initial uplink transmission 914 and the second UE 906 may transmit an initial uplink transmission 916. The first and second UEs 904, 906 may transmit the initial uplink transmissions (e.g., a data transmissions) using the same time-frequency resources of a NOMA channel 918. For example, the first and second UEs 904, 906 may transmit the initial uplink transmissions 914, 916 without a grant from the network node 902.

The network node 902 may receive the initial uplink transmissions 914, 916 at a NOMA receiver 908. In the example of FIG. 9, the NOMA receiver 908 may fail to decode the initial uplink transmissions 914, 916. The NOMA receiver 908 may store uplink transmission information associated with the initial uplink transmissions 914, 916. The NOMA receiver 908 may transmit a first message 920 indicating that the NOMA receiver 908 failed to decode the initial uplink transmission 914 and a second message 922 indicating that the NOMA receiver 908 failed to decode the initial uplink transmissions 916.

The retransmission request controller 910 may receive the first and second messages 920, 922 and may request a retransmission from either the first UE 904 or the second UE 906. In one example, the retransmission request controller 910 may select the second UE 906 to retransmit the initial transmission 916. For example, the retransmission request controller 910 may transmit a retransmission request 924 to the second UE 906. In some examples, the retransmission request 924 may be a NACK.

It should be noted that the retransmission request controller 910 may not request a retransmission of the initial uplink transmission 914 from the first UE 904. In some aspects, the retransmission request controller 910 may transmit a wait signal 926 to the first UE 904. The wait signal 926 serves as an indication to the first UE 904 to temporarily store the latest transmission (e.g., in a buffer) in case a retransmission is needed from the first UE 904. For example, the first UE 904 may store the initial uplink transmission 914 for a period of time in response to the wait signal 926.

The second UE 906 may retransmit the initial uplink transmission 916 without a grant from the network node 902 in response to the retransmission request 924. For example, in FIG. 9, the uplink transmission 928 represents a retransmission of the initial uplink transmission 916. In some examples, the retransmission of the initial uplink transmission 916 may be based on a synchronized HARQ operation.

The IC-based decoder 912 may perform successive interference cancellation (e.g., MMSE-SIC) to successfully decode the initial uplink transmission 916 based on the initial uplink transmission 916 and the uplink transmission 928. At 930, the IC-based decoder 912 may output the successfully decoded initial uplink transmission 916.

At 932, the IC-based decoder 912 may perform successive interference cancellation (e.g., MMSE-SIC) using the successfully decoded initial uplink transmission 916 provided at 930 to retrospectively cancel interference from the initial uplink transmission 914. This may enable the IC-based decoder 912 to successfully decode the initial uplink transmission 914 and to output the successfully decoded initial uplink transmission 914 at 934.

Figure 10:
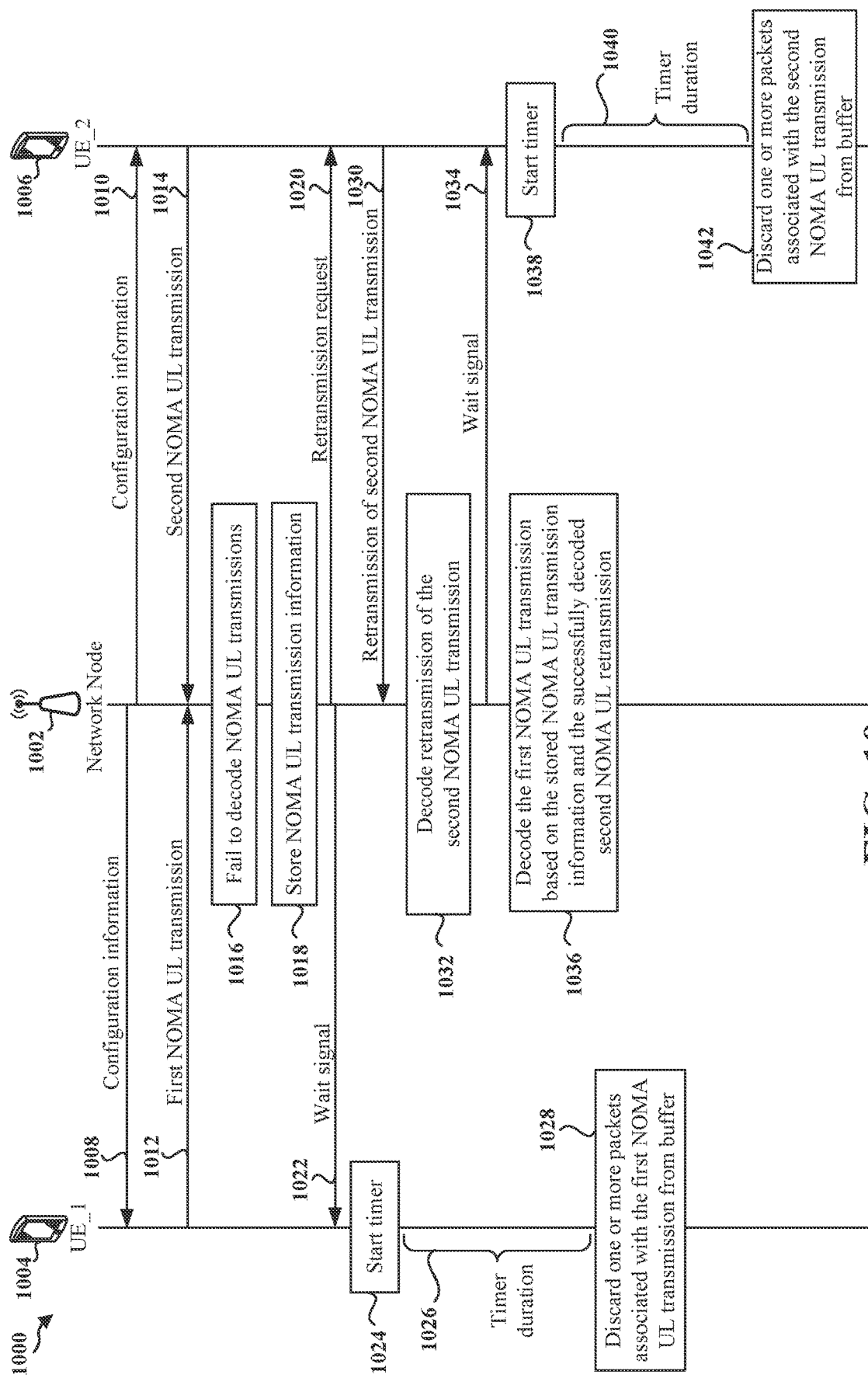
FIG. 10 illustrates a signal flow diagram in accordance with various aspects of the disclosure.

FIG. 10 illustrates a signal flow diagram 1000 in accordance with various aspects of the disclosure. The signal flow diagram 1000 includes a network node 1002, a first UE (UE_1) 1004, and a second UE (UE_2) 1006.

The network node 1002 may transmit configuration information 1008, 1010 to the first and second UEs 1004, 1006. In some examples, the configuration information 1008, 1010 may include at least one of a first resource of a NOMA channel (e.g., a first time-frequency resource of the NOMA channel 918), a second resource of a NOMA channel (e.g., a second time-frequency resource of the NOMA channel 918), a period of time to be used as a duration for a timer associated with a wait signal, mapping information, or combinations thereof.

In some examples, the network node 1002 may transmit the configuration information 1008, 1010 using higher-layer signaling (e.g., an RRC signaling, a MAC signaling, etc.). In some examples, the configuration information 1008, 1010 may be transmitted using a single message broadcast to a group of UEs.

The mapping information may include at least one of a first set of demodulation reference signal ports or a first set of unique multiple access signatures associated with the first resource and at least one of a second set of demodulation reference signal ports or a second set of unique multiple access signatures associated with the second resource.

The first UE 1004 may use the first resource of a NOMA channel to transmit a first NOMA uplink transmission 1012 and the second UE 1006 may use the first resource of the NOMA channel to transmit a second NOMA uplink transmission 1014. In some examples, the first and second UEs 1004, 1006 may transmit the first and second NOMA uplink transmissions 1012, 1014 concurrently. In other examples, at least a portion of the first NOMA uplink transmission 1012 may overlap with at least a portion of the second NOMA uplink transmission 1014 in the time domain.

At 1016, the network node 1002 may fail to decode the first and second NOMA uplink transmissions 1012, 1014.

At 1018, the network node 1002 may store NOMA uplink transmission information. For example, the network node 1002 may store uplink transmission information associated with the first and second NOMA uplink transmissions 1012, 1014 in a storage device (e.g., a memory). For example, the uplink transmission information may include symbols of a modulation scheme (e.g., QAM symbols) associated with an uplink transmission.

The network node 1002 may selectively transmit a retransmission request to the first UE 1004 or the second UE 1006. For example, the network node 1002 may transmit a retransmission request 1020 to the second UE 1006. In some examples, the retransmission request 1020 may be a NACK.

At 1030, the second UE 1006 may retransmit the second NOMA uplink transmission 1014 in response to the retransmission request 1020. For example, the second UE 1006 may use the second resource of the NOMA channel (e.g., the second time-frequency resource of the NOMA channel 918) for the retransmission (e.g., at 1030) of the second NOMA uplink transmission 1014. The second resource may be predefined and indicated to the second UE 1006 via the configuration information 1010.

The network node 1002 may transmit a wait signal 1022 to the first UE 1004. The wait signal 1022 serves as an indication to the first UE 1004 to temporarily store the latest transmission (e.g., in a buffer) in case a retransmission is needed from the first UE 1004. For example, the wait signal 1022 may serve as an indication to the first UE 1004 to store the second NOMA uplink transmission 1012 for a period of time. As previously described, the period of time may be indicated in the configuration information 1008.

At 1024, the first UE 1004 may start a timer in response to the wait signal 1022. In one example, the timer duration 1026 may be the period of time indicated in the configuration information 1008. After expiration of the timer duration 1026, the first UE 1004, at 1028, may discard one or more packets associated with the first NOMA uplink transmission from the buffer 1012.

At 1032, the network node 1002 may successfully decode the retransmission (e.g., at 1030) of the second NOMA uplink transmission 1014.

The network node 1002 may transmit a wait signal 1034 to the second UE 1006. The wait signal 1034 serves as an indication to the second UE 1006 to temporarily store the latest transmission (e.g., in a buffer) in case a retransmission is needed from the second UE 1006. For example, the wait signal 1034 may serve as an indication to the second UE 1006 to store the second NOMA uplink transmission 1012 for a period of time. As previously described, the period of time may be indicated in the configuration information 1010.

At 1038, the second UE 1006 may start a timer in response to the wait signal 1034. In one example, the timer duration 1040 may be the period of time indicated in the configuration information 1010. After expiration of the timer duration 1040, the second UE 1006, at 1042, may discard one or more packets associated with the second NOMA uplink transmission from the buffer 1014.

At 1036, the network node 1002 may successfully decode the first NOMA uplink transmission 1012 based on the NOMA uplink transmission information stored at 1018 and the successfully decoded retransmission of the second NOMA uplink transmission 1014. In some aspects, the network node 1002 may decode the first NOMA uplink transmission 1012 by performing a retrospective interference cancellation operation. For example, the network node 1002 may implement an interference cancellation (IC)-based decoder (e.g., the IC-based decoder 912), which may use the successfully decoded retransmission of the second NOMA uplink transmission 1014 to retrospectively cancel interference from the first NOMA uplink transmission 1012. This may enable the IC-based decoder to successfully decode the first NOMA uplink transmission 1012.

Figure 11:
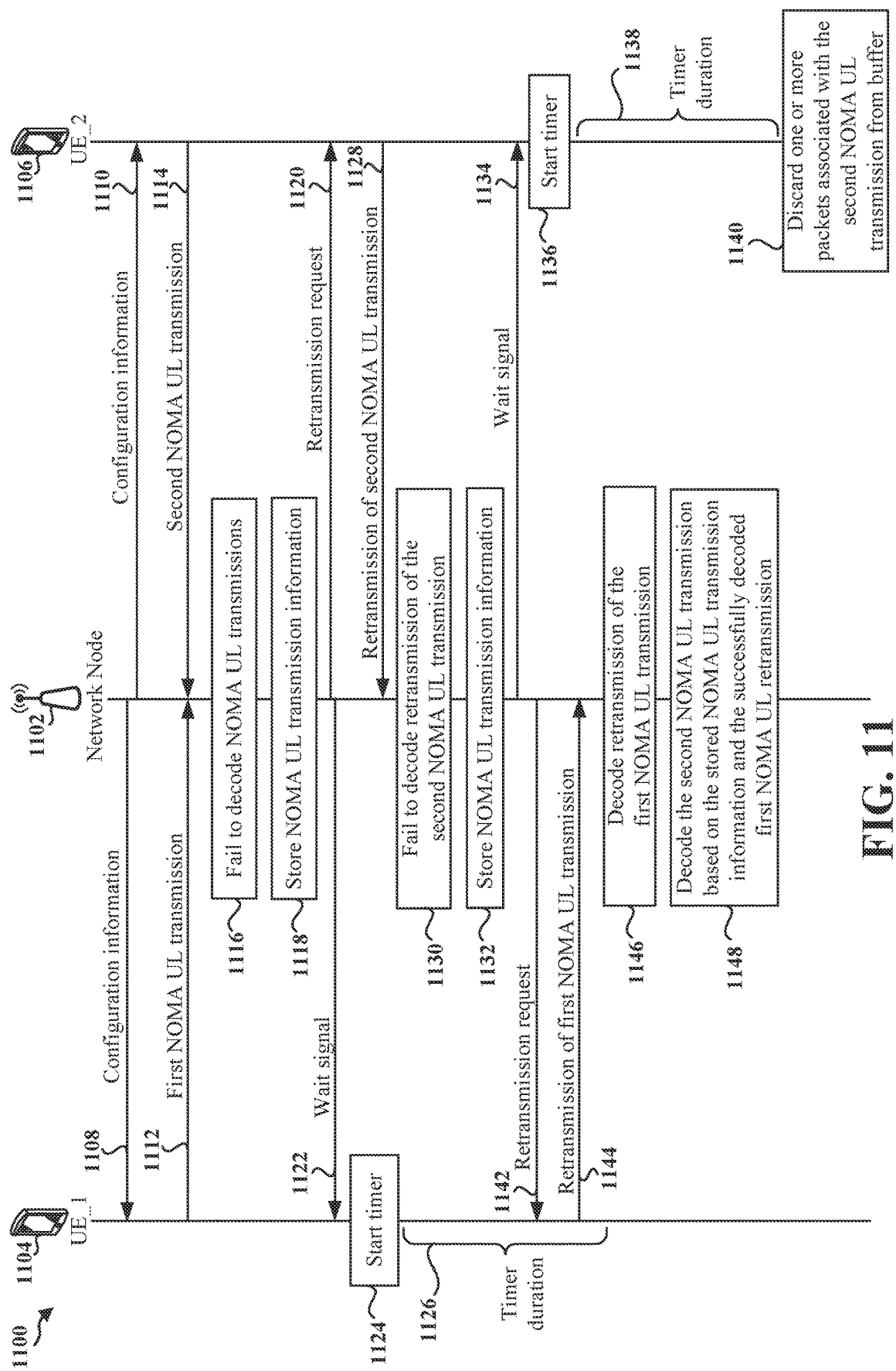
FIG. 11 illustrates a signal flow diagram in accordance with various aspects of the disclosure.

FIG. 11 illustrates a signal flow diagram 1100 in accordance with various aspects of the disclosure. The signal flow diagram 1100 includes a network node 1102, a first UE (UE_1) 1104, and a second UE (UE_2) 1106.

The network node 1102 may transmit configuration information 1108, 1110 to the first and second UEs 1104, 1106. In some examples, the configuration information 1108, 1110 may include at least one of a first resource of a NOMA channel (e.g., a first time-frequency resource of the NOMA channel 918), a second resource of a NOMA channel (e.g., a second time-frequency resource of the NOMA channel 918), a period of time to be used as a duration for a timer associated with the wait signal, mapping information, or combinations thereof.

In some examples, the network node 1102 may transmit the configuration information 1108, 1110 using higher-layer signaling (e.g., an RRC signaling, a MAC signaling, etc.). In some examples, the configuration information 1108, 1110 may be transmitted using a single message broadcast to a group of UEs.

The mapping information may include at least one of a first set of demodulation reference signal ports or a first set of unique multiple access signatures associated with the first resource and at least one of a second set of demodulation reference signal ports or a second set of unique multiple access signatures associated with the second resource.

The first UE 1104 may use a first resource (e.g., a first time-frequency resource) of a NOMA channel to transmit a first NOMA uplink transmission 1112 and the second UE 1106 may use the first resource of the NOMA channel to transmit a second NOMA uplink transmission 1114. In some examples, the first and second UEs 1104, 1106 may transmit the first and second NOMA uplink transmissions 1112, 1114 concurrently. In other examples, at least a portion of the first NOMA uplink transmission 1112 may overlap with at least a portion of the second NOMA uplink transmission 1114 in the time domain.

At 1116, the network node 1102 may fail to decode the first and second NOMA uplink transmissions 1112, 1114.

At 1118, the network node 1102 may store NOMA uplink transmission information. For example, the network node 1102 may store uplink transmission information associated with the first and second NOMA uplink transmissions 1112, 1114 in a storage device (e.g., a memory). For example, the uplink transmission information may include symbols of a modulation scheme (e.g., QAM symbols) associated with an uplink transmission.

The network node 1102 may selectively transmit a retransmission request to the first UE 1104 or the second UE 1106. For example, the network node 1102 may transmit a retransmission request 1120 to the second UE 1106. In some examples, the retransmission request 1120 may be a NACK.

The network node 1102 may transmit a wait signal 1122 to the first UE 1104. The wait signal 1122 serves as an indication to the first UE 1104 to temporarily store the latest transmission (e.g., in a buffer) in case a retransmission is needed from the first UE 1104. For example, the wait signal 1122 may serve as an indication to the first UE 1104 to store the first NOMA uplink transmission 1112 for a period of time. As previously described, the period of time may be indicated in the configuration information 1108.

At 1124, the first UE 1104 may start a timer in response to the wait signal 1122. In one example, the timer duration 1126 may be the period of time indicated in the configuration information 1108.

At 1128, the second UE 1106 may retransmit the second NOMA uplink transmission 1114 in response to the retransmission request 1120. For example, the second UE 1106 may use a second resource (e.g., a second time-frequency resource) of the NOMA channel for the retransmission (e.g., at 1128) of the second NOMA uplink transmission 1114. The second resource may be predefined and indicated to the second UE 1106 via the configuration information 1110.

At 1130, the network node 1102 may fail to decode the retransmission of the second NOMA uplink transmission 1114.

At 1132, the network node 1102 may store uplink transmission information associated with the retransmission of the second NOMA uplink transmission 1114. For example, the network node 1102 may store uplink transmission information associated with the retransmission (e.g., 1128) of the second NOMA uplink transmission 1114 in a storage device (e.g., a memory). For example, the uplink transmission information may include symbols of a modulation scheme (e.g., QAM symbols) associated with an uplink transmission.

The network node 1102 may transmit a wait signal 1134 to the second UE 1106. The wait signal 1134 serves as an indication to the second UE 1106 to temporarily store the latest transmission (e.g., in a buffer) in case a retransmission is needed from the second UE 1106. For example, the wait signal 1134 may serve as an indication to the second UE 1106 to store the second NOMA uplink transmission 1114 for a period of time. As previously described, the period of time may be indicated in the configuration information 1110.

At 1136, the second UE 1106 may start a timer in response to the wait signal 1134. In one example, the timer duration 1138 may be the period of time indicated in the configuration information 1110. At 1140, the second UE 1106 may discard one or more packets associated with the second NOMA uplink transmission 1114 from a buffer at the second UE 1106 upon expiration of the timer (e.g., at the of the timer duration 1138).

The network node 1102 may transmit a retransmission request 1142 to the first UE 1104. In some examples, the retransmission request 1142 may be a NACK. It should be noted that the network node 1102 may transmit a retransmission request 1142 prior to expiration of the timer (e.g., prior to the end of the timer duration 1126).

At 1144, the first UE 1104 may retransmit the first NOMA uplink transmission 1112 in response to the retransmission request 1142. For example, the first UE 1104 may use a third resource (e.g., a third time-frequency resource) of the NOMA channel for the retransmission (e.g., at 1144) of the first NOMA uplink transmission 1112. The third resource may be predefined and indicated to the first UE 1104 via the configuration information 1108.

At 1146, the network node 1102 may successfully decode the retransmission of the first NOMA uplink transmission 1112.

At 1148, the network node 1102 may successfully decode the second NOMA uplink transmission 1114 based on the stored NOMA uplink transmission information (e.g., at 1118, 1132) and the successfully decoded retransmission of the first NOMA uplink transmission 1146.

At 1148, the network node 1102 may successfully decode the second NOMA uplink transmission 1114 based on the NOMA uplink transmission information stored at 1118, 1132 and the successfully decoded retransmission (e.g., at 1144) of the first NOMA uplink transmission 1112. In some aspects, the network node 1102 may decode the second NOMA uplink transmission 1114 by performing a retrospective interference cancellation operation. For example, the network node 1102 may implement an IC-based decoder (e.g., the IC-based decoder 912), which may use the successfully decoded retransmission (e.g., at 1144) of the first NOMA uplink transmission 1112 to retrospectively cancel interference from the second NOMA uplink transmission 1114. This may enable the IC-based decoder to successfully decode the second NOMA uplink transmission 1114.

In some aspects of the disclosure, a UE (e.g., UE 904, 1004, 1104) may use a first DM-RS port and/or a first unique multiple access signature for an initial NOMA uplink transmission on a NOMA channel and may use a second DM-RS port and/or a second unique multiple access signature for a retransmission of the initial NOMA uplink transmission on the NOMA channel. In some examples, the second DM-RS port is associated with the first DM-RS port and the second unique multiple access signature is associated with the first unique multiple access signature based on a preconfigured mapping. In some aspects, a network node (e.g., network node 902, 1002, 1102) may provide the preconfigured mapping to the UE (e.g., UE 904, 1004, 1104) via configuration information (e.g., configuration information 1008, 1010, 1108, 1110). An example of the preconfigured mapping will now be described with reference to FIG. 12.

Figure 12:
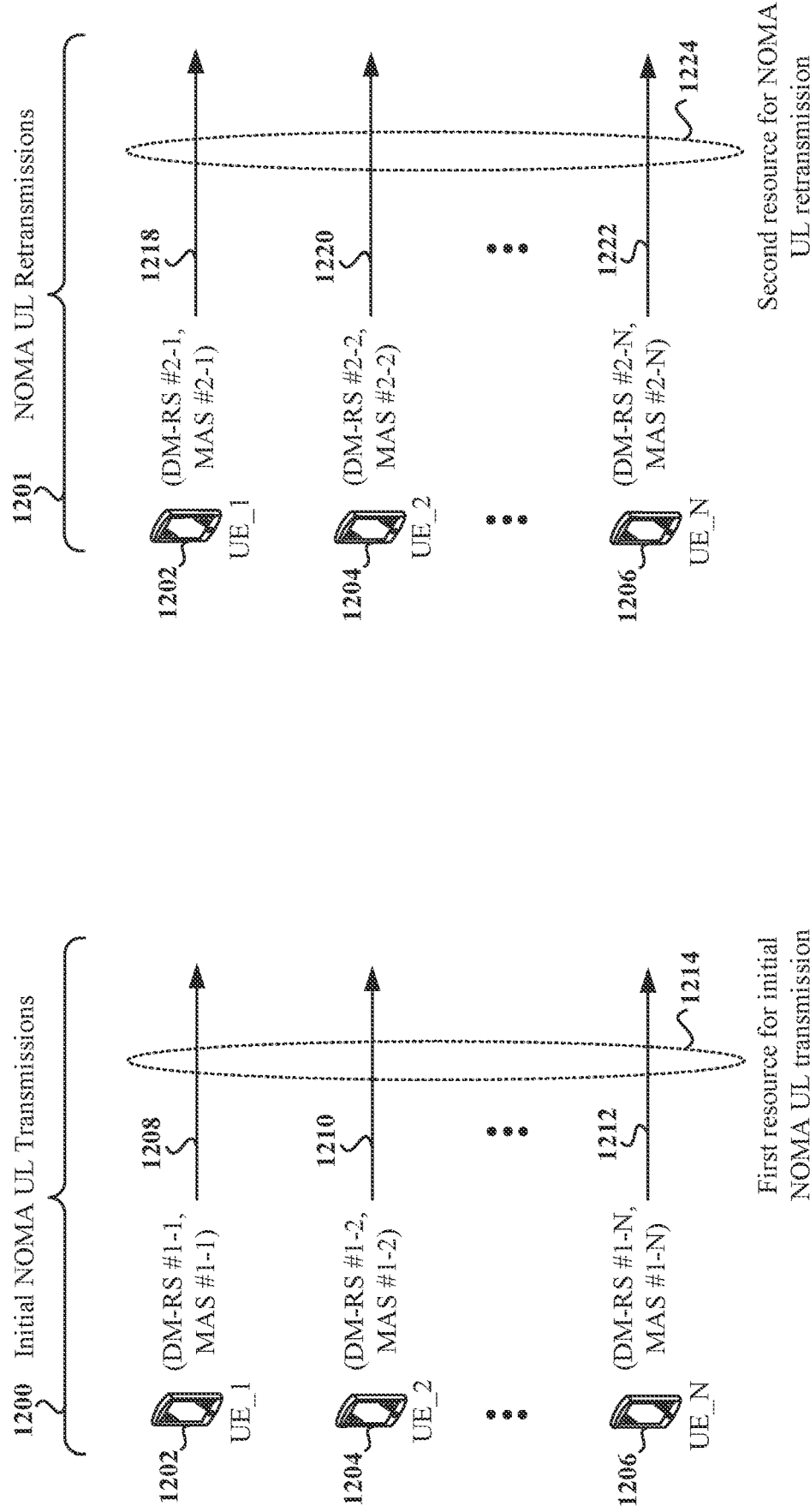
FIG. 12 includes N UEs transmitting initial NOMA uplink transmissions and NOMA uplink retransmissions.

FIG. 12 includes N UEs transmitting initial NOMA uplink transmissions 1200 and NOMA UL retransmissions 1201. The N UEs include a first UE (UE_1) 1202, a second UE (UE_2) 1202, and an Nth UE (UE_N) 1206. Each of the N UEs may transmit an initial NOMA uplink transmission using a first resource 1214 for initial NOMA uplink transmissions. For example, the first UE 1202, the second UE 1204, and the Nth UE 1206 may transmit respective initial NOMA uplink transmissions 1208, 1210, 1212 using the first resource 1214. In some examples, the first resource 1214 may be a first time-frequency resource of a NOMA channel.

Each of the N UEs may retransmit an initial NOMA uplink transmission using a second resource 1224 for NOMA uplink retransmissions. For example, the first UE 1202, the second UE 1204, and an Nth UE 1206 may retransmit respective initial NOMA uplink transmissions 1208, 1210, 1212 using the second resource 1224. In some examples, the second resource 1224 may be a second time-frequency resource of a NOMA channel.

In FIG. 12, each of the NOMA uplink retransmissions 1218, 1220, 1222 may be a HARQ retransmission of an initial NOMA uplink transmission. For example, the NOMA uplink retransmission 1218 may be a HARQ retransmission of the initial NOMA uplink transmission 1208, the NOMA uplink retransmission 1220 may be a HARQ retransmission of the initial NOMA uplink transmissions 1210, and the NOMA uplink retransmission 1222 may be a HARQ retransmission of the initial NOMA uplink transmissions 1212.

Each of the N UEs may receive or may be preconfigured with resource mapping information. In some examples, the resource mapping information may include a first set of DM-RS ports and a first set of unique multiple access signatures associated with the first resource 1214, and may include a second set of DM-RS ports and a second set of unique multiple access signatures associated with the second resource 1224.

Each DM-RS port in the first set of DM-RS ports may be mapped to a respective DM-RS port in the second set of DM-RS ports, and each unique multiple access signature in the first set of unique multiple access signatures may be mapped to a respective unique multiple access signature in the second set of unique multiple access signatures. Table 1 illustrates an example of the resource mapping information.

TABLE 1

| First Set of DM-RS Ports and First Set of Unique MASs | Second Set of DM-RS Ports and Second Set of Unique MASs |
|---|---|
| DM-RS #1-1, MAS #1-1 | DM-RS #2-1, MAS #2-1 |
| DM-RS #1-1, MAS #1-2 | DM-RS #2-1, MAS #2-2 |
| . . . | . . . |
| DM-RS #1-N, MAS #1-N | DM-RS #2-N, MAS #2-N |

In one example, with reference to Table 1 and FIG. 12, the first UE 1202 may use a first DM-RS port (e.g., DM-RS #1-1) and/or a first multiple access signature (e.g., MAS #1-1) from the first set of DM-RS ports and the first set of unique multiple access signatures for the initial NOMA uplink transmission 1208. The first UE 1202 may use a corresponding first DM-RS port (e.g., DM-RS #2-1) and/or a first multiple access signature (e.g., MAS #2-1) from the second set of DM-RS ports and the second set of unique multiple access signatures for the NOMA uplink retransmission 1218.

In another example, the Nth UE 1206 may use an Nth DM-RS port (e.g., DM-RS #1-N) and/or an Nth multiple access signature (e.g., MAS #1-N) from the first set of DM-RS ports and the first set of unique multiple access signatures for the initial NOMA uplink transmission 1212. The Nth UE 1206 may use a corresponding first DM-RS port (e.g., DM-RS #2-N) and/or a first multiple access signature (e.g., MAS #2-N) from the second set of DM-RS ports and the second set of unique multiple access signatures for the NOMA uplink retransmission 1222.

It should be understood that the retransmissions 1218, 1220, 1222 from the N UEs in FIG. 12 are shown to facilitate understanding of the resource mapping information in Table 1. For example, in accordance with the described aspects, a subset (e.g., some) of the N UEs in FIG. 12 may be allowed retransmit their initial NOMA uplink transmissions.

In some aspects, a UE may select a DM-RS port from the first set of DM-RS ports and/or a unique multiple access signature from the first set of unique multiple access signatures. In some aspects, the UE may randomly select the DM-RS port and/or the unique multiple access signature. In other aspects, the UE may select the DM-RS port and/or the unique multiple access signature based on preconfigured information at the UE.

Since there is a predefined relationship between a DM-RS port a UE may use for an initial NOMA uplink transmission and a different DM-RS port a UE may use for a retransmission of the initial NOMA uplink transmission, a network node having knowledge of the predefined relationship may determine that a certain retransmission is associated with a certain initial NOMA uplink transmission based on the DM-RS ports used at the UE. This may allow the network node to combine an initial NOMA uplink transmission from a UE with a retransmission from that same UE.

In another example, since there is a predefined relationship between a unique multiple access signature a UE may use for an initial NOMA uplink transmission and a different unique multiple access signature a UE may use for a retransmission of the initial NOMA uplink transmission, a network node having knowledge of the predefined relationship may determine that a certain retransmission is associated with a certain initial NOMA uplink transmission based on the unique multiple access signatures used at the UE. This may allow the network node to combine an initial NOMA uplink transmission from a UE with a retransmission from that same UE.

In some aspects of the disclosure, a retransmission request (e.g., the retransmission request 920, 1020, 1042 described with reference to FIGS. 9, 10, 11) may be included in a control information message. Each of a set of bit positions in the control information message may be associated with a different UE. For example, the control information message may be a HARQ feedback message common to a group of UEs. For example, each bit in the HARQ feedback message may be associated with a different DM-RS port and/or a unique multiple access signature used for an initial NOMA uplink transmission by a certain UE. A network node may indicate a subset of UEs which are to perform a retransmission using a resource of a NOMA channel by setting bit positions associated with different DM-RS ports and/or a unique multiple access signatures to a certain value (e.g., '0'). This is described with reference to FIG. 13.

Figure 13:
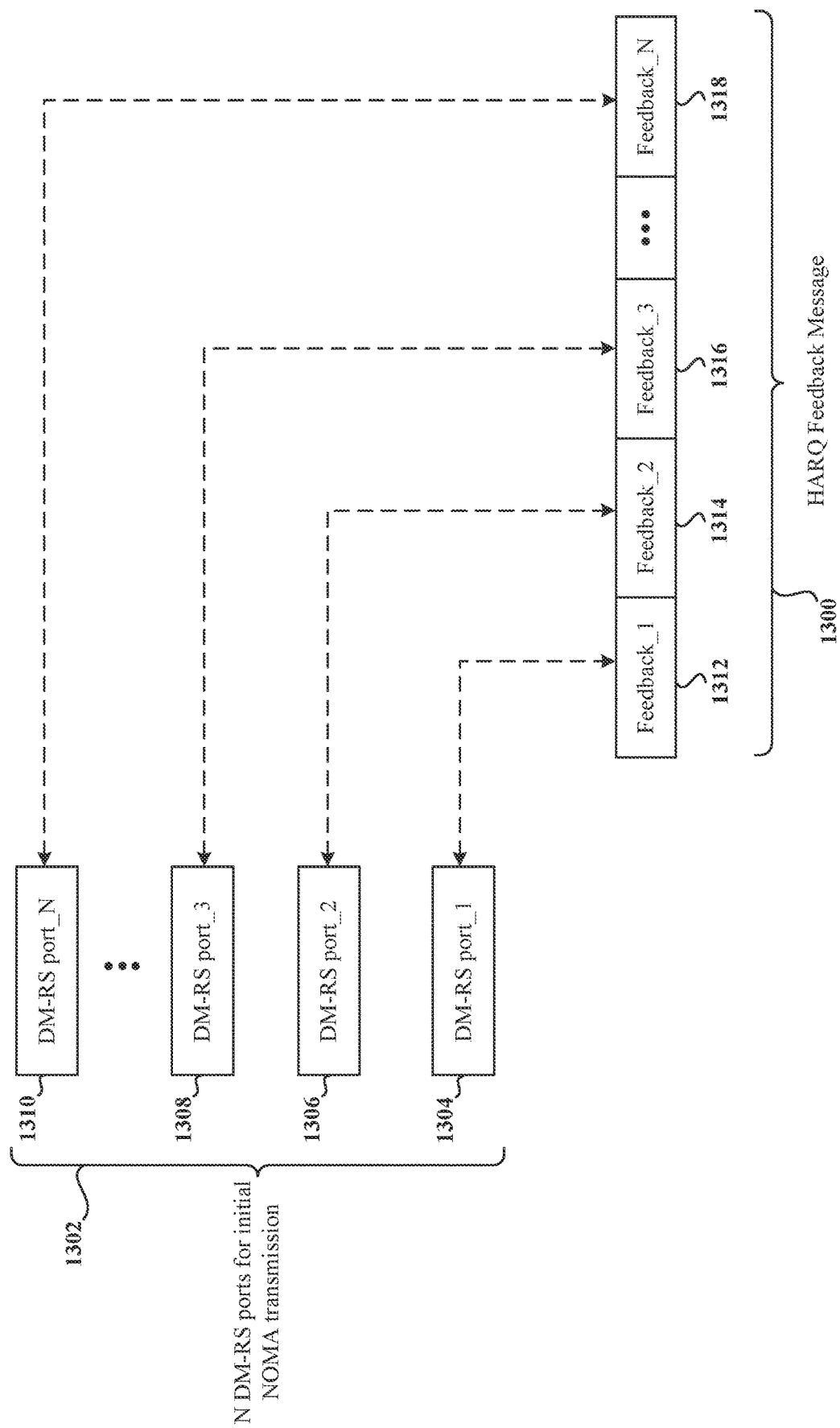
FIG. 13 illustrates a HARQ feedback message in accordance with various aspects of the disclosure.

FIG. 13 illustrates a HARQ feedback message 1300 in accordance with various aspects of the disclosure. In some examples, the HARQ feedback message 1300 may be based on a group-common DCI format. The length of the HARQ feedback message 1300 may depend on the number of DM-RS ports and/or unique multiple access signatures configured for a NOMA resource.

In the example of FIG. 13, the length of the HARQ feedback message 1300 may be N bits. A first bit 1312 may carry a first feedback value (Feedback_1), a second bit 1314 may carry a second feedback value (Feedback_2), a third bit 1316 may carry a third feedback value (Feedback_3), and an Nth bit 1318 may carry an Nth feedback value (Feedback_N).

Each of the N bits in the HARQ feedback message 1300 may be mapped to one of N DM-RS ports 1302. Each of the N DM-RS ports 1302 may be used by a different UE for an initial NOMA uplink transmission. For example, the first bit 1312 may be mapped to a first DM-RS port 1304, the second bit 1314 may be mapped to a second DM-RS port 1306, the third bit 1316 may be mapped to a third DM-RS port 1308, and the Nth bit 1318 may be mapped to an Nth DM-RS port 1310.

In some examples, each feedback value in the HARQ feedback message 1300 may be a first value (e.g., '0') or a second value (e.g., '1'). For example, the first value may indicate a request for retransmission (e.g., a NACK) of an initial uplink NOMA transmission and the second value may indicate a wait signal.

If a network node determines that a set of initial NOMA uplink transmissions from a set of UEs cannot be decoded, the network node may selectively request retransmission from a subset of the set of UEs using the HARQ feedback message 1300. In one example scenario, the network node may determine that a first initial NOMA uplink transmission from a first UE that used the first DM-RS port 1304 cannot be decoded and that a second initial NOMA uplink transmission from a second UE that used the second DM-RS port 1306 cannot be decoded. In this scenario, the network node may selectively request a retransmission from the first UE or the second UE. For example, if the network node selects a retransmission from the first UE that used the first DM-RS port 1304, the network node may set the first bit 1312 to the first value (e.g., '0') and the second bit 1314 to the second value (e.g., '1'). If the network node selects a retransmission from the second UE that used the second DM-RS port 1306, the network node may set the second bit 1314 to the first value (e.g., '0') and the first bit 1312 to the second value (e.g., '1').

A UE that receives the HARQ feedback message 1300 may monitor a bit in the HARQ feedback message 1300 mapped to the DM-RS port used by the UE for the initial NOMA uplink transmission. For example, the first UE that used the first DM-RS port 1304 may monitor the first bit 1312 in the HARQ feedback message 1300, and the second UE that used the second DM-RS port 1306 may monitor the second bit 1314 in the HARQ feedback message 1300. Therefore, if the first UE determines that the first bit 1312 is set to the first value (e.g., '0'), the first UE may retransmit the first initial NOMA uplink transmission. If the second UE determines that the second bit 1314 is set to the second value (e.g., '0'), the second UE may retransmit the second initial NOMA uplink transmission.

Figure 14:
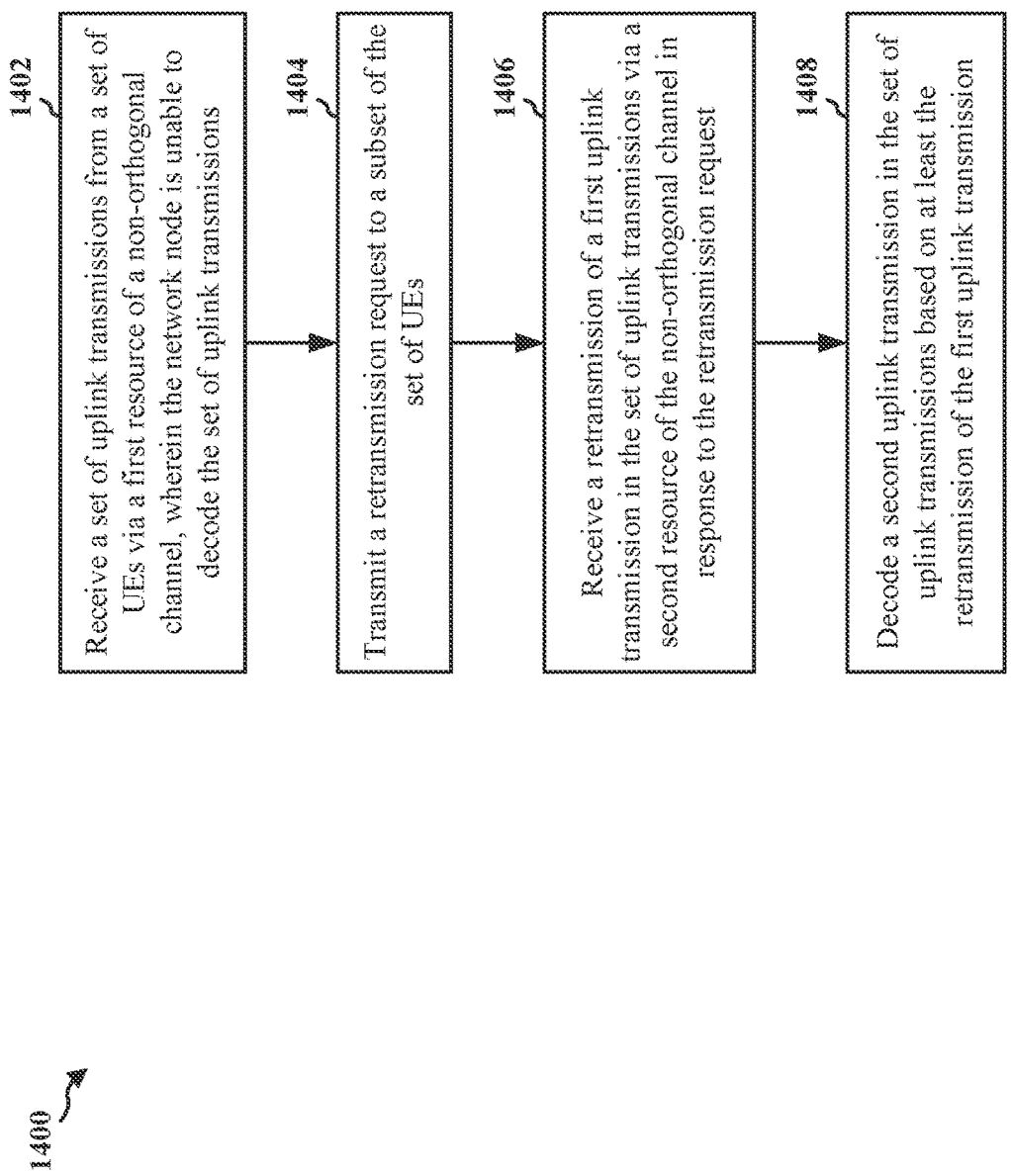
FIG. 14 is a flowchart of a method of wireless communication.

FIG. 14 is a flowchart 1400 of a method of wireless communication. The method may be performed by a network node (e.g., the base station 102; the network node 902, 1002, 1102, the apparatus 1602/1602'; the processing system 1714, which may include the memory 376 and which may be the entire network node or a component of the network node, such as the TX processor 316, the RX processor 370, and/or the controller/processor 375).

At 1402, the network node receives a set of uplink transmissions from a set of UEs via a first resource of a non-orthogonal channel, wherein the network node is unable to decode the set of uplink transmissions. For example, with reference to FIG. 9, the network node 902 may receive an initial uplink transmission 914 from the first UE 904 and an initial uplink transmission 916 from the second UE 906 on the same time-frequency resources of the NOMA channel 918. In the example of FIG. 9, the NOMA receiver 908 may fail to decode the initial uplink transmissions 914, 916.

For example, with reference to FIG. 10, the network node 1002 may receive the first NOMA uplink transmission 1012 from the first UE 1004 and may receive the second NOMA uplink transmission 1014 from the second UE 1006 via a first resource of a NOMA channel. At 1016, the network node 1002 may fail to decode the first and second NOMA uplink transmissions 1012, 1014.

For example, with reference to FIG. 11, the network node 1102 may receive the first NOMA uplink transmission 1112 from the first UE 1104 and may receive the second NOMA uplink transmission 1114 from the second UE 1106 via a first resource of a NOMA channel. At 1116, the network node 1102 may fail to decode the first and second NOMA uplink transmissions 1112, 1114.

In some examples, the first resource of the non-orthogonal channel includes at least one of a first time resource or a first frequency resource. The second resource of the non-orthogonal channel includes at least one of a second time resource or a second frequency resource.

At 1404, the network node transmits a retransmission request to a subset of the set of UEs. For example, with reference to FIG. 9, a retransmission request controller 910 of the network node 902 may receive the first and second messages 920, 922 indicating that the NOMA receiver 908 of the network node 902 failed to decode the initial uplink transmissions 914, 916 and may request a retransmission from either the first UE 904 or the second UE 906. In one example, the retransmission request controller 910 may select the second UE 906 to retransmit the initial transmission 916. For example, the retransmission request controller 910 may transmit a retransmission request 924 to the second UE 906. In some examples, the retransmission request 924 may be a NACK.

For example, with reference to FIG. 10, the network node 1002 may selectively transmit a retransmission request to the first UE 1004 or the second UE 1006. For example, the network node 1002 may transmit a retransmission request 1020 to the second UE 1006. In some examples, the retransmission request 1020 may be a NACK.

For example, with reference to FIG. 11, the network node 1102 may selectively transmit a retransmission request to the first UE 1104 or the second UE 1106. For example, the network node 1102 may transmit a retransmission request 1142 to the first UE 1104. In some examples, the retransmission request 1142 may be a NACK.

In some examples, the retransmission request is transmitted in a control information message, where each of a set of bit positions in the control information message is associated with a different UE in the set of UEs. In some examples, the retransmission request is transmitted in a control information message, where each of a set of bit positions in the control information message is associated with at least one of a unique multiple access signature or a different demodulation reference signal port for the non-orthogonal channel. For example, the control information message may be a HARQ feedback message common to a group of UEs. For example, each bit in the HARQ feedback message may be associated with a different DM-RS port and/or a unique multiple access signature used for an initial NOMA uplink transmission by a certain UE. The network node may indicate a subset of UEs which are to perform a retransmission using a resource of a NOMA channel by setting bit positions associated with different DM-RS ports and/or unique multiple access signatures to a certain value (e.g., '0') as described herein with reference to FIG. 13.

In some examples, the first uplink transmission (e.g., the initial uplink transmission 914, the first NOMA uplink transmission 1012, the first NOMA uplink transmission 1112) in the set of uplink transmissions is associated with at least one of a first demodulation reference signal port or a first unique multiple access signature and the retransmission of the first uplink transmission (e.g., the uplink transmission 928, the retransmission (e.g., at 1030) of the second NOMA uplink transmission 1014, the retransmission (e.g., at 1144) of the first NOMA uplink transmission 1112) is associated with at least one of a second demodulation reference signal port or a second unique multiple access signature. In some examples, the second demodulation reference signal port is associated with the first demodulation reference signal port and the second unique multiple access signature is associated with the first unique multiple access signature based on a preconfigured mapping.

At 1406, the network node receives a retransmission of a first uplink transmission in the set of uplink transmissions via a second resource of the non-orthogonal channel in response to the retransmission request.

For example, with reference to FIG. 9, the network node 902 may receive a retransmission (e.g., the uplink transmission 928) of the initial uplink transmission 916 from the second UE 906 without a grant from the network node 902 in response to the retransmission request 924. In some examples, the retransmission of the initial uplink transmission 916 may be based on a synchronized HARQ operation.

For example, with reference to FIG. 10, network node 1002 may receive a retransmission (e.g., at 1030) of the second NOMA uplink transmission 1014 from the second UE 1006 in response to the retransmission request 1020. For example, the second UE 1006 may use the second resource of the NOMA channel (e.g., the second time-frequency resource of the NOMA channel 918) for the retransmission (e.g., at 1030) of the second NOMA uplink transmission 1014. The second resource may be predefined and indicated to the second UE 1006 via the configuration information 1010.

For example, with reference to FIG. 11, the network node 1102 may receive a retransmission (e.g., at 1144) of the first NOMA uplink transmission 1112 from the first UE 1104 in response to the retransmission request 1142. For example, the first UE 1104 may use a third resource (e.g., a third time-frequency resource) of the NOMA channel for the retransmission (e.g., at 1144) of the first NOMA uplink transmission 1112. The third resource may be predefined and indicated to the first UE 1104 via the configuration information 1108.

At 1408, the network node decodes a second uplink transmission in the set of uplink transmissions based on at least the retransmission of the first uplink transmission. For example, with reference to FIG. 9, the IC-based decoder 912 of the network node 902 may successfully decode the initial uplink transmission 916 based on the initial uplink transmission 916 and the uplink transmission 928 (e.g., the retransmission of the initial uplink transmission 916) and may output the successfully decoded uplink transmission 930. At 932, the IC-based decoder 912 uses the successfully decoded uplink transmission 930 to retrospectively cancel interference from the initial uplink transmission 914. This may enable the IC-based decoder 912 to successfully decode the initial uplink transmission 914 and output the successfully decoded uplink transmission 934.

For example, with reference to FIG. 10, the network node 1002 at 1032 may successfully decode the retransmission (e.g., at 1030) of the second NOMA uplink transmission 1014. The network node 1002 at 1036 may successfully decode the first NOMA uplink transmission 1012 based on the NOMA uplink transmission information stored at 1018 and the successfully decoded retransmission of the second NOMA uplink transmission 1014. In some aspects, the network node 1002 may decode the first NOMA uplink transmission 1012 by performing a retrospective interference cancellation operation. For example, the network node 1002 may implement an interference cancellation (IC)-based decoder (e.g., the IC-based decoder 912), which may use the successfully decoded retransmission of the second NOMA uplink transmission 1014 to retrospectively cancel interference from the first NOMA uplink transmission 1012. This may enable the IC-based decoder to successfully decode the first NOMA uplink transmission 1012.

For example, with reference to FIG. 11, the network node 1102 at 1146 may successfully decode the retransmission (e.g., at 1144) of the first NOMA uplink transmission 1112. At 1148, the network node 1102 may successfully decode the second NOMA uplink transmission 1114 based on the stored NOMA uplink transmission information (e.g., at 1118, 1132) and the successfully decoded retransmission of the first NOMA uplink transmission 1146.

At 1148, the network node 1102 may successfully decode the second NOMA uplink transmission 1114 based on the NOMA uplink transmission information stored at 1118, 1132 and the successfully decoded retransmission (e.g., at 1144) of the first NOMA uplink transmission 1112. In some aspects, the network node 1102 may decode the second NOMA uplink transmission 1114 by performing a retrospective interference cancellation operation. For example, the network node 1102 may implement an interference cancellation (IC)-based decoder (e.g., the IC-based decoder 912), which may use the successfully decoded retransmission (e.g., at 1144) of the first NOMA uplink transmission 1112 to retrospectively cancel interference from the second NOMA uplink transmission 1114. This may enable the IC-based decoder to successfully decode the second NOMA uplink transmission 1114.

Figure 15:
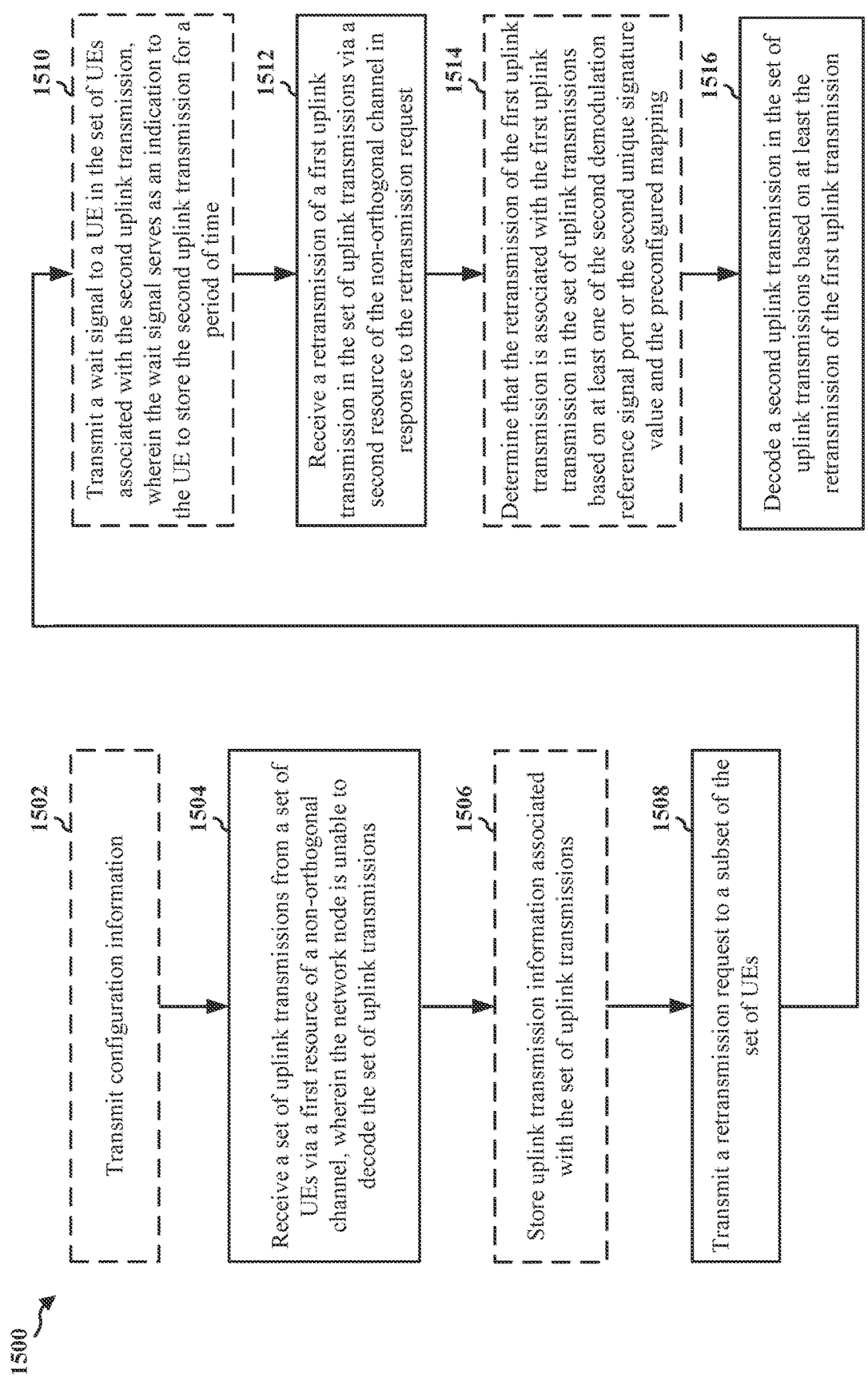
FIG. 15 is a flowchart of a method of wireless communication.

FIG. 15 is a flowchart 1500 of a method of wireless communication. The method may be performed by a network node (e.g., the base station 102; the network node 902, 1002, 1102, the apparatus 1602/1602'; the processing system 1714, which may include the memory 376 and which may be the entire network node or a component of the network node, such as the TX processor 316, the RX processor 370, and/or the controller/processor 375).

At 1502, the network node transmits configuration information. For example, with reference to FIG. 10, the network node 1002 may transmit configuration information 1008, 1010 to the first and second UEs 1004, 1006. For example, with reference to FIG. 11, the network node 1102 may transmit configuration information 1108, 1110 to the first and second UEs 1104, 1106.

In some examples, the configuration information (e.g., the configuration information 1008, 1010, 1108, 1110) may include at least one of a first resource of a NOMA channel (e.g., a first time-frequency resource of the NOMA channel 918), a second resource of a NOMA channel (e.g., a second time-frequency resource of the NOMA channel 918), a period of time to be used as a duration for a timer associated with a wait signal, mapping information, or combinations thereof.

At 1504, the network node receives a set of uplink transmissions from a set of UEs via a first resource of a non-orthogonal channel, wherein the network node is unable to decode the set of uplink transmissions. For example, with reference to FIG. 9, the network node 902 may receive an initial uplink transmission 914 from the first UE 904 and an initial uplink transmission 916 from the second UE 906 on the same time-frequency resources of the NOMA channel 918. In the example of FIG. 9, the NOMA receiver 908 may fail to decode the initial uplink transmissions 914, 916.

For example, with reference to FIG. 10, the network node 1002 may receive the first NOMA uplink transmission 1012 from the first UE 1004 and may receive the second NOMA uplink transmission 1014 from the second UE 1006 via a first resource of a NOMA channel. At 1016, the network node 1002 may fail to decode the first and second NOMA uplink transmissions 1012, 1014.

For example, with reference to FIG. 11, the network node 1102 may receive the first NOMA uplink transmission 1112 from the first UE 1104 and may receive the second NOMA uplink transmission 1114 from the second UE 1106 via a first resource of a NOMA channel. At 1116, the network node 1102 may fail to decode the first and second NOMA uplink transmissions 1112, 1114.

In some examples, the first resource of the non-orthogonal channel includes at least one of a first time resource or a first frequency resource. The second resource of the non-orthogonal channel includes at least one of a second time resource or a second frequency resource.

At 1506, the network node stores uplink transmission information associated with the set of uplink transmissions. For example, with reference to FIG. 9, the NOMA receiver 908 of the network node 902 may store uplink transmission information associated with the initial uplink transmissions 914, 916. For example, with reference to FIG. 10, at 1018, the network node 1002 may store NOMA uplink transmission information. For example, the network node 1002 may store uplink transmission information associated with the first and second NOMA uplink transmissions 1012, 1014 in a storage device (e.g., a memory). For example, the uplink transmission information may include symbols of a modulation scheme (e.g., QAM symbols) associated with an uplink transmission.

For example, with reference to FIG. 11, at 1118, the network node 1102 may store NOMA uplink transmission information. For example, the network node 1102 may store uplink transmission information associated with the first and second NOMA uplink transmissions 1112, 1114 in a storage device (e.g., a memory). For example, the uplink transmission information may include symbols of a modulation scheme (e.g., QAM symbols) associated with an uplink transmission.

At 1508, the network node transmits a retransmission request to a subset of the set of UEs. For example, with reference to FIG. 9, a retransmission request controller 910 of the network node 902 may receive the first and second messages 920, 922 indicating that the NOMA receiver 908 of the network node 902 failed to decode the initial uplink transmissions 914, 916 and may request a retransmission from either the first UE 904 or the second UE 906. In one example, the retransmission request controller 910 may select the second UE 906 to retransmit the initial transmission 916. For example, the retransmission request controller 910 may transmit a retransmission request 924 to the second UE 906. In some examples, the retransmission request 924 may be a NACK.

For example, with reference to FIG. 10, the network node 1002 may selectively transmit a retransmission request to the first UE 1004 or the second UE 1006. For example, the network node 1002 may transmit a retransmission request 1020 to the second UE 1006. In some examples, the retransmission request 1020 may be a NACK.

For example, with reference to FIG. 11, the network node 1102 may selectively transmit a retransmission request to the first UE 1104 or the second UE 1106. For example, the network node 1102 may transmit a retransmission request 1142 to the first UE 1104. In some examples, the retransmission request 1142 may be a NACK.

In some examples, the retransmission request is transmitted in a control information message, where each of a set of bit positions in the control information message is associated with a different UE in the set of UEs. In some examples, the retransmission request is transmitted in a control information message, where each of a set of bit positions in the control information message is associated with at least one of a unique multiple access signature or a different demodulation reference signal port for the non-orthogonal channel. For example, the control information message may be a HARQ feedback message common to a group of UEs. For example, each bit in the HARQ feedback message may be associated with a different DM-RS port and/or a unique multiple access signature used for an initial NOMA uplink transmission by a certain UE. The network node may indicate a subset of UEs which are to perform a retransmission using a resource of a NOMA channel by setting bit positions associated with different DM-RS ports and/or a unique multiple access signatures to a certain value (e.g., '0') as described herein with reference to FIG. 13.

In some examples, the first uplink transmission (e.g., the initial uplink transmission 914, the first NOMA uplink transmission 1012, the first NOMA uplink transmission 1112) in the set of uplink transmissions is associated with at least one of a first demodulation reference signal port or a first unique multiple access signature and the retransmission of the first uplink transmission (e.g., the uplink transmission 928, the retransmission (e.g., at 1030) of the second NOMA uplink transmission 1014, the retransmission (e.g., at 1144) of the first NOMA uplink transmission 1112) is associated with at least one of a second demodulation reference signal port or a second unique multiple access signature. In some examples, the second demodulation reference signal port is associated with the first demodulation reference signal port and the second unique multiple access signature is associated with the first unique multiple access signature based on a preconfigured mapping.

At 1510, the network node transmits a wait signal to a UE in the set of UEs associated with the second uplink transmission, wherein the wait signal serves as an indication to the UE to store the second uplink transmission for a period of time.

For example, with reference to FIG. 9, the retransmission request controller 910 of the network node 902 may transmit a wait signal 926 to the first UE 904. For example, with reference to FIG. 10, the network node 1002 may transmit a wait signal 1022 to the first UE 1004. The wait signal 1022 serves as an indication to the first UE 1004 to store the second NOMA uplink transmission 1012 for a period of time. For example, with reference to FIG. 11, the network node 1102 may transmit a wait signal 1122 to the first UE 1104. The wait signal 1122 serves as an indication to the first UE 1104 to store the first NOMA uplink transmission 1112 for a period of time.

At 1512, the network node receives a retransmission of a first uplink transmission in the set of uplink transmissions via a second resource of the non-orthogonal channel in response to the retransmission request. For example, with reference to FIG. 9, the network node 902 may receive a retransmission (e.g., the uplink transmission 928) of the initial uplink transmission 916 from the second UE 906 without a grant from the network node 902 in response to the retransmission request 924. In some examples, the retransmission of the initial uplink transmission 916 may be based on a synchronized HARQ operation.

For example, with reference to FIG. 10, network node 1002 may receive a retransmission (e.g., at 1030) of the second NOMA uplink transmission 1014 from the second UE 1006 in response to the retransmission request 1020. For example, the second UE 1006 may use the second resource of the NOMA channel (e.g., the second time-frequency resource of the NOMA channel 918) for the retransmission (e.g., at 1030) of the second NOMA uplink transmission 1014. The second resource may be predefined and indicated to the second UE 1006 via the configuration information 1010.

For example, with reference to FIG. 11, the network node 1102 may receive a retransmission (e.g., at 1144) of the first NOMA uplink transmission 1112 from the first UE 1104 in response to the retransmission request 1142. For example, the first UE 1104 may use a third resource (e.g., a third time-frequency resource) of the NOMA channel for the retransmission (e.g., at 1144) of the first NOMA uplink transmission 1112. The third resource may be predefined and indicated to the first UE 1104 via the configuration information 1108.

At 1514, the network node determines that the retransmission of the first uplink transmission is associated with the first uplink transmission in the set of uplink transmissions based on at least one of the second demodulation reference signal port or the second unique multiple access signature value and the preconfigured mapping.

For example, there may be a predefined relationship between a DM-RS port a UE may use for an initial NOMA uplink transmission and a different DM-RS port a UE may use for a retransmission of the initial NOMA uplink transmission as described with reference to the resource mapping information in Table 1 and FIG. 12. The network node may have knowledge of the predefined relationship and may determine that a certain retransmission is associated with a certain initial NOMA uplink transmission based on the DM-RS ports used at the UE.

In another example, there may be a predefined relationship between a unique multiple access signature a UE may use for an initial NOMA uplink transmission and a different unique multiple access signature a UE may use for a retransmission of the initial NOMA uplink transmission as described with reference to the resource mapping information in Table 1 and FIG. 12. The network node may have knowledge of the predefined relationship and may determine that a certain retransmission is associated with a certain initial NOMA uplink transmission based on the unique multiple access signatures used at the UE.

At 1516, the network node decodes a second uplink transmission in the set of uplink transmissions based on at least the retransmission of the first uplink transmission. For example, with reference to FIG. 9, the IC-based decoder 912 of the network node 902 may perform successive interference cancellation (e.g., MMSE-SIC) to successfully decode the initial uplink transmission 916 based on the initial uplink transmission 916 and the uplink transmission 928 (e.g., the retransmission of the initial uplink transmission 916). At 930, the IC-based decoder 912 may output the successfully decoded initial uplink transmission 916. At 932, the IC-based decoder 912 may perform successive interference cancellation (e.g., MMSE-SIC) using the successfully decoded initial uplink transmission 916 provided at 930 to retrospectively cancel interference from the initial uplink transmission 914. This may enable the IC-based decoder 912 to successfully decode the initial uplink transmission 914 and to output the successfully decoded initial uplink transmission 914 at 934.

Figure 16:
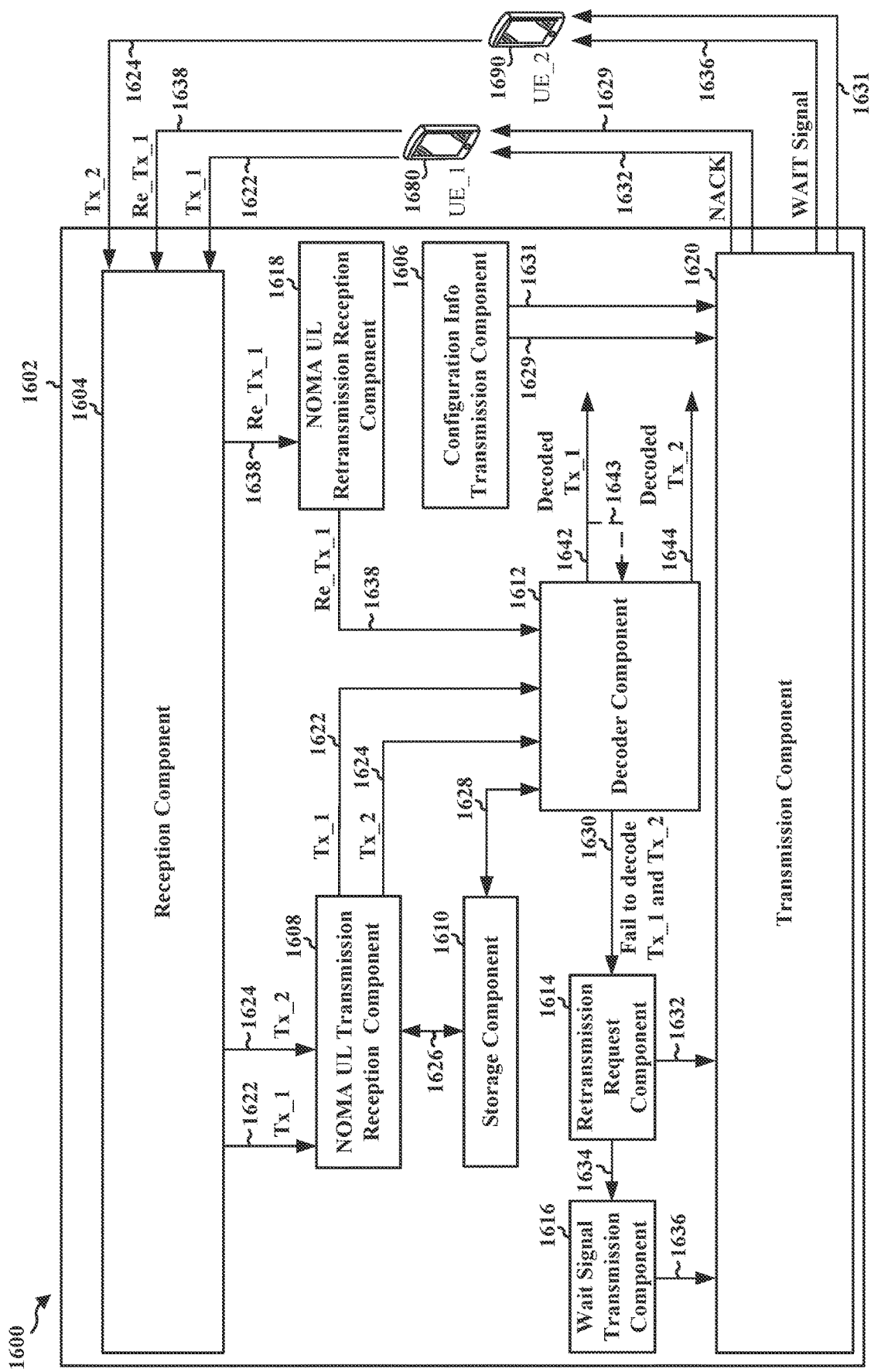
FIG. 16 is a conceptual data flow diagram illustrating the data flow between different means/components in an example apparatus.

FIG. 16 is a conceptual data flow diagram 1600 illustrating the data flow between different means/components in an example apparatus 1602. The apparatus may be a network node.

The apparatus 1602 includes a reception component 1604 that receives uplink transmissions from a set of UEs including a first UE (UE_1) 1680 and a second UE (UE_2) 1690.

The apparatus 1602 further includes a configuration information transmission component 1606 that transmits configuration information 1629, 1631.

The apparatus 1602 further includes a NOMA uplink transmission reception component 1608 that receives a set of uplink transmissions from the set of UEs (e.g., the first UE 1680 and the second UE 1690) via a first resource of a non-orthogonal channel. For example, the NOMA uplink transmission reception component 1608 receives (e.g., via the reception component 1604) a first uplink transmission (Tx_1) 1622 from a first UE 1680 and a second uplink transmission (Tx_2) 1624 from the second UE 1690 via a first resource of a non-orthogonal channel.

The apparatus 1602 further includes a storage component 1610 that stores uplink transmission information associated with the set of uplink transmissions. The storage component 1610 may receive the uplink transmission information from the NOMA uplink transmission reception component 1608 via the data path 1626.

The apparatus 1602 further includes a decoder component 1612 that decodes the second uplink transmission (e.g., the second uplink transmission 1624) in the set of uplink transmissions based on at least a retransmission of the first uplink transmission (e.g., a retransmission 1638 of the first uplink transmission 1622). For example, the decoder component 1612 may be an IC-based decoder, such as the IC-based decoder 912 described herein.

In some aspects, the decoder component 1612 provides an output 1642 including the decoded first uplink transmission 1622. For example, the decoder component 1612 may provide the output 1642 based on a successive interference cancellation (e.g., MMSE-SIC) performed using the uplink transmission information for the first uplink transmission 1622 received from the storage component 1610 via the data path 1628 and the retransmission 1638 of the first uplink transmission 1622.

In some aspects, the decoder component 1612 decodes the second uplink transmission (e.g., the second uplink transmission 1624) based on the uplink transmission information (e.g., the uplink transmission information received from the storage component 1610 via the data path 1628) and the retransmission 1638 of the first uplink transmission 1622. For example, the decoder component 1612 may decode the second uplink transmission by performing a successive interference cancellation (e.g., MMSE-SIC) using the uplink transmission information for the second uplink transmission 1624 received from the storage component 1610 via the data path 1628 and the decoded first uplink transmission 1622 received at 1643. In some aspects, the decoder component 1612 provides an output 1644 including the decoded second uplink transmission 1624.

In some aspects, the decoder component 1612 determines that the retransmission of the first uplink transmission (e.g., the retransmission 1638 of the first uplink transmission 1622) is associated with the first uplink transmission in the set of uplink transmissions based on at least one of the second demodulation reference signal port or the second unique multiple access signature and the preconfigured mapping.

The apparatus 1602 further includes a retransmission request component 1614 that transmits a retransmission request 1632 to a subset of the set of UEs. In some aspects, the retransmission request component 1614 transmits the retransmission request 1632 in response to a message 1630 from the decoder component 1612 indicating a failure to decode the first and second uplink transmissions 1622, 1624.

The apparatus 1602 further includes a wait signal transmission component 1616 that transmits a wait signal 1636 to a UE in the set of UEs associated with the second uplink transmission (e.g., the second UE 1690 associated with the second uplink transmission 1624), where the wait signal 1636 serves as an indication to the UE to store the second uplink transmission for a period of time. In some aspects, the wait signal transmission component 1616 transmits the wait signal 1636 in response to a message 1634 from the retransmission request component 1614 indicating that a retransmission request 1632 has been transmitted to a subset of the set of UEs.

The apparatus 1602 further includes a NOMA uplink retransmission reception component 1618 that receives a retransmission (Re_Tx_1) 1638 of the first uplink transmission 1622 in the set of uplink transmissions via a second resource of the non-orthogonal channel.

The apparatus 1602 further includes a transmission component 1620 that transmits downlink signals to one or more UEs in the set of UEs including a first UE (UE_1) 1680 and a second UE (UE_2) 1690.

The apparatus may include additional components that perform each of the blocks of the algorithm in the aforementioned flowcharts of FIGS. 14 and 15. As such, each block in the aforementioned flowcharts of FIGS. 14 and 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 17:
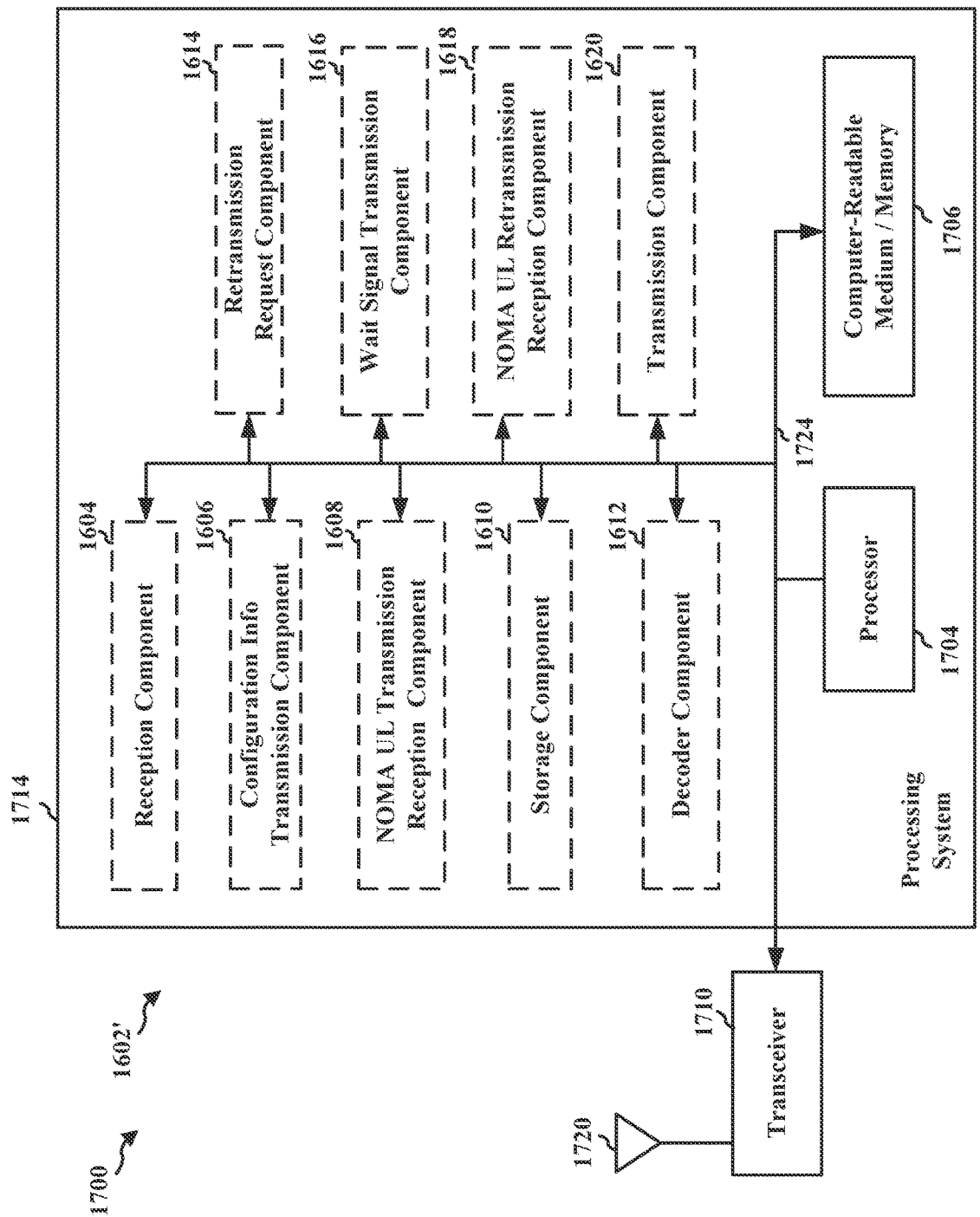
FIG. 17 is a diagram illustrating an example of a hardware implementation for an apparatus employing a processing system.

FIG. 17 is a diagram 1700 illustrating an example of a hardware implementation for an apparatus 1602' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware components, represented by the processor 1704, the components 1604, 1606, 1608, 1610, 1612, 1614, 1616, 1618, 1620 and the computer-readable medium/memory 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The transceiver 1710 receives a signal from the one or more antennas 1720, extracts information from the received signal, and provides the extracted information to the processing system 1714, specifically the reception component 1604. In addition, the transceiver 1710 receives information from the processing system 1714, specifically the transmission component 1620, and based on the received information, generates a signal to be applied to the one or more antennas 1720. The processing system 1714 includes a processor 1704 coupled to a computer-readable medium/memory 1706. The processor 1704 is responsible for general processing, including the execution of software stored on the computer-readable medium/memory 1706. The software, when executed by the processor 1704, causes the processing system 1714 to perform the various functions described supra for any particular apparatus. The computer-readable medium/memory 1706 may also be used for storing data that is manipulated by the processor 1704 when executing software. The processing system 1714 further includes at least one of the components 1604, 1606, 1608, 1610, 1612, 1614, 1616, 1618. The components may be software components running in the processor 1704, resident/stored in the computer readable medium/memory 1706, one or more hardware components coupled to the processor 1704, or some combination thereof. The processing system 1714 may be a component of a network node (e.g., the base station 310) and may include the memory 376 and/or at least one of the TX processor 316, the RX processor 370, and the controller/processor 375. Alternatively, the processing system 1714 may be the entire network node (e.g., see 310 of FIG. 3).

In one configuration, the apparatus 1602/1602' for wireless communication includes means for receiving a set of uplink transmissions from a set of UEs via a first resource of a non-orthogonal channel, wherein the apparatus is unable to decode the set of uplink transmissions, means for transmitting a retransmission request to a subset of the set of UEs, means for receiving a retransmission of a first uplink transmission in the set of uplink transmissions via a second resource of the non-orthogonal channel in response to the retransmission request, means for decoding a second uplink transmission in the set of uplink transmissions based on at least the retransmission of the first uplink transmission, means for transmitting a wait signal to a UE in the set of UEs associated with the second uplink transmission, wherein the wait signal serves as an indication to the UE to store the second uplink transmission for a period of time, means for transmitting configuration information including at least the period of time, means for storing uplink transmission information associated with the set of uplink transmissions, wherein the second uplink transmission is decoded based on the uplink transmission information and the retransmission of the first uplink transmission, means for determining that the retransmission of the first uplink transmission is associated with the first uplink transmission in the set of uplink transmissions based on at least one of the second demodulation reference signal port or the second unique multiple access signature and the preconfigured mapping, means for transmitting configuration information including at least mapping information, the mapping information including at least one of a first plurality of demodulation reference signal ports or a first plurality of unique multiple access signatures associated with the first resource and at least one of a second plurality of demodulation reference signal ports or a second plurality of unique multiple access signatures associated with the second resource.

The aforementioned means may be one or more of the aforementioned components of the apparatus 1602 and/or the processing system 1714 of the apparatus 1602' configured to perform the functions recited by the aforementioned means. As described supra, the processing system 1714 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 18:
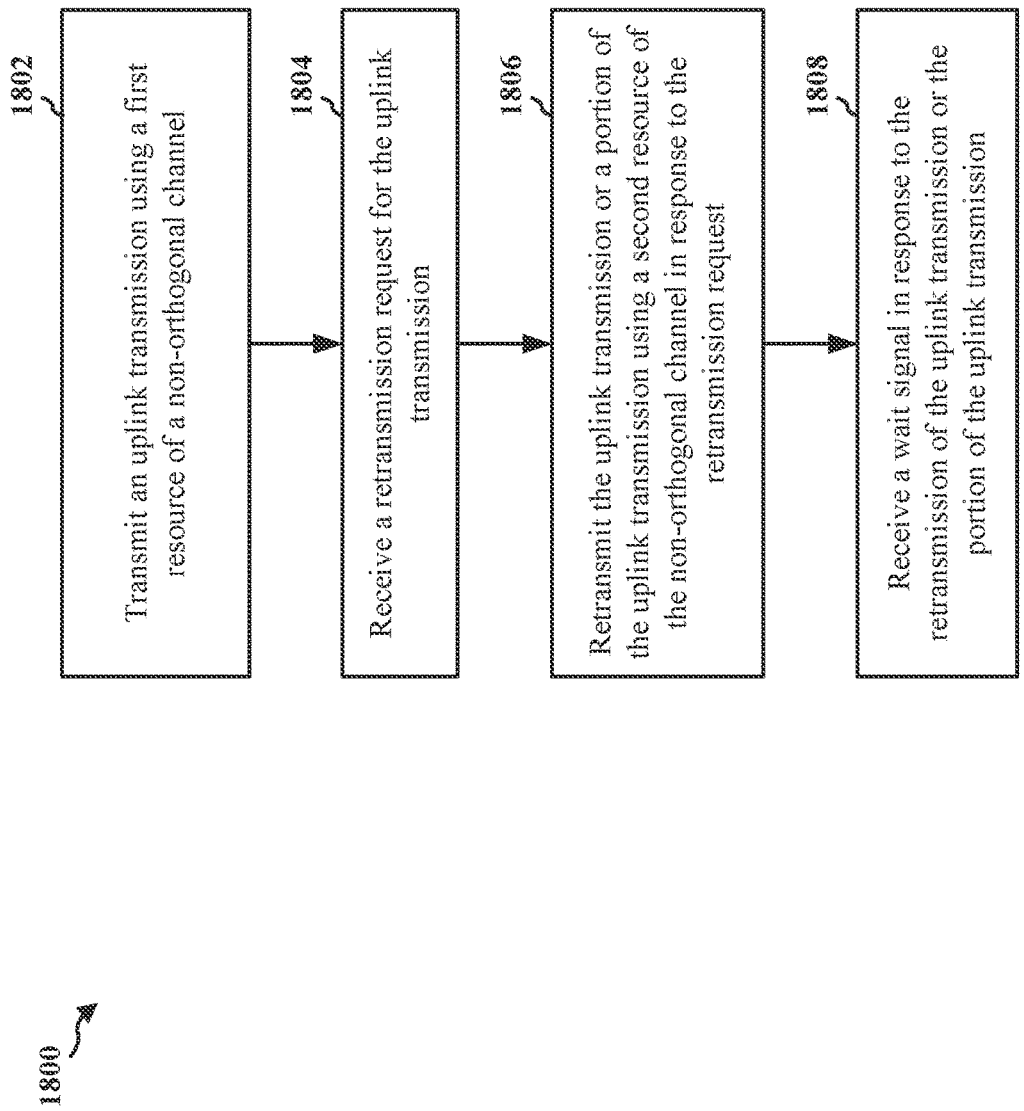
FIG. 18 is a flowchart of a method of wireless communication.

FIG. 18 is a flowchart 1800 of a method of wireless communication. The method may be performed by a UE (e.g., the UE 1004, 1006, 1104, 1106; the apparatus 2002/2002'; the processing system 2114, which may include the memory 360 and which may be the entire UE 1004, 1006, 1104, 1106 or a component of the UE 1004, 1006, 1104, 1106, such as the TX processor 368, the RX processor 356, and/or the controller/processor 359).

At 1802, the UE transmits an uplink transmission using a first resource of a non-orthogonal channel. For example, with reference to FIG. 9, the second UE 906 may transmit an initial uplink transmission 916 using time-frequency resources of the NOMA channel 918.

For example, with reference to FIG. 10, the second UE 1006 may use a first resource of a NOMA channel to transmit the second NOMA uplink transmission 1014. For example, with reference to FIG. 11, the first UE 1104 may use a first resource (e.g., a first time-frequency resource) of a NOMA channel to transmit a first NOMA uplink transmission 1112.

In some examples, the first resource of the non-orthogonal channel includes at least one of a first time resource or a first frequency resource. The second resource of the non-orthogonal channel includes at least one of a second time resource or a second frequency resource.

At 1804, the UE receives a retransmission request for the uplink transmission. For example, with reference to FIG. 9, the second UE 906 may receive the retransmission request 924. In some examples, the retransmission request 924 may be a NACK. For example, with reference to FIG. 10, the second UE 1006 may receive the retransmission request 1020. In some examples, the retransmission request 1020 may be a NACK. For example, with reference to FIG. 11, the network node 1102 may selectively transmit a retransmission request to the first UE 1104 or the second UE 1106. For example, the first UE 1104 may receive the retransmission request 1142. In some examples, the retransmission request 1142 may be a NACK.

In some examples, the retransmission request is received in a control information message, where each of a set of bit positions in the control information message is associated with a different UE in the set of UEs. In some examples, the retransmission request is received in a control information message, where each of a set of bit positions in the control information message is associated with at least one of a unique multiple access signature or a different demodulation reference signal port for the non-orthogonal channel. For example, the control information message may be a HARQ feedback message common to a group of UEs. For example, each bit in the HARQ feedback message may be associated with a different DM-RS port and/or a unique multiple access signature used for an initial NOMA uplink transmission by a certain UE. A UE may determine that a retransmission is requested when a bit position (e.g., in the HARQ feedback message) associated with its DM-RS port and/or unique multiple access signature is set to a certain value (e.g., '0') as described herein with reference to FIG. 13.

In some examples, the first uplink transmission (e.g., the initial uplink transmission 914, the first NOMA uplink transmission 1012, the first NOMA uplink transmission 1112) in the set of uplink transmissions is associated with at least one of a first demodulation reference signal port or a first unique multiple access signature and the retransmission of the first uplink transmission (e.g., the uplink transmission 928, the retransmission (e.g., at 1030) of the second NOMA uplink transmission 1014, the retransmission (e.g., at 1144) of the first NOMA uplink transmission 1112) is associated with at least one of a second demodulation reference signal port or a second unique multiple access signature. In some examples, the second demodulation reference signal port is associated with the first demodulation reference signal port and the second unique multiple access signature is associated with the first unique multiple access signature based on a preconfigured mapping.

At 1806, the UE retransmits the uplink transmission or a portion of the uplink transmission using a second resource of the non-orthogonal channel in response to the retransmission request. For example, with reference to FIG. 9, the second UE 906 may transmit a retransmission (e.g., the uplink transmission 928) of the initial uplink transmission 916 without a grant from the network node 902 in response to the retransmission request 924. In some examples, the retransmission of the initial uplink transmission 916 may be based on a synchronized HARQ operation.

For example, with reference to FIG. 10, the second UE 1006 may transmit a retransmission (e.g., at 1030) of the second NOMA uplink transmission 1014 from in response to the retransmission request 1020. For example, the second UE 1006 may use the second resource of the NOMA channel (e.g., the second time-frequency resource of the NOMA channel 918) for the retransmission (e.g., at 1030) of the second NOMA uplink transmission 1014. The second resource may be predefined and indicated to the second UE 1006 via the configuration information 1010.

For example, with reference to FIG. 11, the first UE 1104 may transmit a retransmission (e.g., at 1144) of the first NOMA uplink transmission 1112 in response to the retransmission request 1142. For example, the first UE 1104 may use a third resource (e.g., a third time-frequency resource) of the NOMA channel for the retransmission (e.g., at 1144) of the first NOMA uplink transmission 1112. The third resource may be predefined and indicated to the first UE 1104 via the configuration information 1108.

At 1808, the UE receives a wait signal in response to the retransmission of the uplink transmission or the portion of the uplink transmission. For example, with reference to FIG. 9, the first UE 904 may receive the wait signal 926. For example, with reference to FIG. 10, the first UE 1004 may receive a wait signal 1022. For example, with reference to FIG. 11, the second UE 1106 may receive the wait signal 1134. As described herein, the wait signal 926, 1022, 1134 serves as an indication to the UE to temporarily store the latest transmission (e.g., in a buffer) in case a retransmission is needed from the UE.

Figure 19:
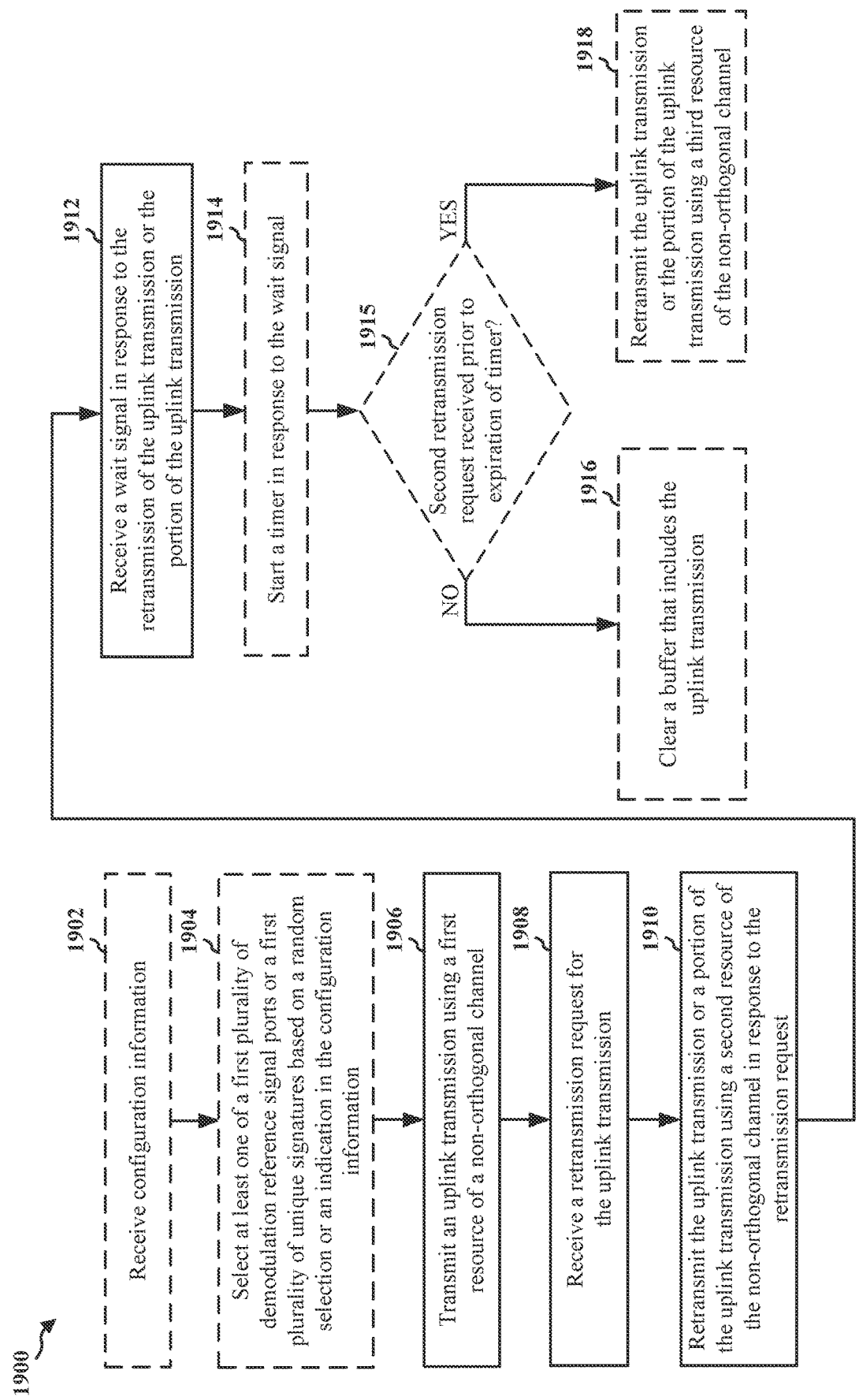
FIG. 19 is a flowchart of a method of wireless communication.

FIG. 19 is a flowchart 1900 of a method of wireless communication. The method may be performed by a UE (e.g., the UE 1004, 1006, 1104, 1106; the apparatus 2002/2002'; the processing system 2114, which may include the memory 360 and which may be the entire UE 1004, 1006, 1104, 1106 or a component of the UE 1004, 1006, 1104, 1106, such as the TX processor 368, the RX processor 356, and/or the controller/processor 359). It should be understood that blocks indicated with dashed lines in FIG. 19 represent optional blocks.

At 1902, the UE receives configuration information. For example, with reference to FIG. 10, the second UE 1006 may receive configuration information 1010. For example, with reference to FIG. 11, the first UE 1104 may receive configuration information 1108.

In some examples, the configuration information (e.g., the configuration information 1010, 1108) may include at least one of a first resource of a NOMA channel (e.g., a first time-frequency resource of the NOMA channel 918), a second resource of a NOMA channel (e.g., a second time-frequency resource of the NOMA channel 918), a period of time to be used as a duration for a timer associated with a wait signal, mapping information, or combinations thereof.

At 1904, the UE selects at least one of a first plurality of demodulation reference signal ports or a first plurality of unique signatures based on a random selection or an indication in the configuration information. For example, the UE may select from the first set of DM-RS ports and/or the first set of unique multiple access signatures described with reference to Table 1.

At 1906, the UE transmits an uplink transmission using a first resource of a non-orthogonal channel. For example, with reference to FIG. 9, the second UE 906 may transmit the initial uplink transmission 916 on a time-frequency resource of the NOMA channel 918. For example, with reference to FIG. 10, the second UE 1006 may transmit the second NOMA uplink transmission 1014 over a first resource of a NOMA channel. For example, with reference to FIG. 11, the first UE 1104 may transmit the first NOMA uplink transmission using a first resource of a NOMA channel.

At 1908, the UE receives a retransmission request for the uplink transmission. For example, with reference to FIG. 9, the second UE 906 may receive the retransmission request 924. In some examples, the retransmission request 924 may be a NACK. For example, with reference to FIG. 10, the second UE 1006 may receive the retransmission request 1020. In some examples, the retransmission request 1020 may be a NACK. For example, with reference to FIG. 11, the network node 1102 may selectively transmit a retransmission request to the first UE 1104 or the second UE 1106. For example, the first UE 1104 may receive the retransmission request 1142. In some examples, the retransmission request 1142 may be a NACK.

In some examples, the retransmission request is received in a control information message, where each of a set of bit positions in the control information message is associated with a different UE in the set of UEs. In some examples, the retransmission request is received in a control information message, where each of a set of bit positions in the control information message is associated with at least one of a unique multiple access signature or a different demodulation reference signal port for the non-orthogonal channel. For example, the control information message may be a HARQ feedback message common to a group of UEs. For example, each bit in the HARQ feedback message may be associated with a different DM-RS port and/or a unique multiple access signature used for an initial NOMA uplink transmission by a certain UE. A UE may determine that a retransmission is requested when a bit position (e.g., in the HARQ feedback message) associated with its DM-RS port and/or unique multiple access signature is set to a certain value (e.g., '0') as described herein with reference to FIG. 13.

In some examples, the first uplink transmission (e.g., the initial uplink transmission 914, the first NOMA uplink transmission 1012, the first NOMA uplink transmission 1112) in the set of uplink transmissions is associated with at least one of a first demodulation reference signal port or a first unique multiple access signature and the retransmission of the first uplink transmission (e.g., the uplink transmission 928, the retransmission (e.g., at 1030) of the second NOMA uplink transmission 1014, the retransmission (e.g., at 1144) of the first NOMA uplink transmission 1112) is associated with at least one of a second demodulation reference signal port or a second unique multiple access signature. In some examples, the second demodulation reference signal port is associated with the first demodulation reference signal port and the second unique multiple access signature is associated with the first unique multiple access signature based on a preconfigured mapping.

At 1910, the UE retransmits the uplink transmission or a portion of the uplink transmission using a second resource of the non-orthogonal channel in response to the retransmission request. For example, with reference to FIG. 9, the second UE 906 may transmit a retransmission (e.g., the uplink transmission 928) of the initial uplink transmission 916 without a grant from the network node 902 in response to the retransmission request 924. In some examples, the retransmission of the initial uplink transmission 916 may be based on a synchronized HARQ operation.

For example, with reference to FIG. 10, the second UE 1006 may transmit a retransmission (e.g., at 1030) of the second NOMA uplink transmission 1014 from in response to the retransmission request 1020. For example, the second UE 1006 may use the second resource of the NOMA channel (e.g., the second time-frequency resource of the NOMA channel 918) for the retransmission (e.g., at 1030) of the second NOMA uplink transmission 1014. The second resource may be predefined and indicated to the second UE 1006 via the configuration information 1010.

For example, with reference to FIG. 11, the first UE 1104 may transmit a retransmission (e.g., at 1144) of the first NOMA uplink transmission 1112 in response to the retransmission request 1142. For example, the first UE 1104 may use a third resource (e.g., a third time-frequency resource) of the NOMA channel for the retransmission (e.g., at 1144) of the first NOMA uplink transmission 1112. The third resource may be predefined and indicated to the first UE 1104 via the configuration information 1108.

At 1912, the UE receives a wait signal in response to the retransmission of the uplink transmission or the portion of the uplink transmission. For example, with reference to FIG. 9, the first UE 904 may receive the wait signal 926. For example, with reference to FIG. 10, the first UE 1004 may receive a wait signal 1022. For example, with reference to FIG. 11, the second UE 1106 may receive the wait signal 1134. As described herein, the wait signal 926, 1022, 1134 serves as an indication to the UE to temporarily store the latest transmission (e.g., in a buffer) in case a retransmission is needed from the UE.

At 1914, the UE starts a timer in response to the wait signal. In one example, with reference to FIG. 10, the timer duration 1026 may be the period of time indicated in the configuration information 1008. In one example, with reference to FIG. 11, the timer duration 1126 may be the period of time indicated in the configuration information 1108.

At 1915, the UE determines whether a second retransmission request is received for the retransmission of the uplink transmission or the portion of the uplink transmission prior to an expiration of the timer.

At 1916, the UE clears a buffer that includes the uplink transmission if the second retransmission request is not received for the retransmission of the uplink transmission or the portion of the uplink transmission prior to expiration of the timer. For example, with reference to FIG. 10, the first UE 1004 at 1028 may discard one or more packets associated with the first NOMA uplink transmission from the buffer of the first UE 1004. For example, with reference to FIG. 11, the second UE 1106 at 1140 may discard one or more packets associated with the second NOMA uplink transmission from the buffer of the second UE 1106.

At 1918, the UE retransmits the uplink transmission or the portion of the uplink transmission using a third resource of the non-orthogonal channel if a second retransmission request is received for the uplink transmission prior to expiration of the timer. For example, with reference to FIG. 11, the first UE 1104 may receive the retransmission request 1142 prior to expiration of the timer (e.g., prior to the end of the timer duration 1126). At 1144, the first UE 1104 may retransmit the first NOMA uplink transmission 1112 in response to the retransmission request 1142. For example, the first UE 1104 may use a third resource (e.g., a third time-frequency resource) of the NOMA channel for the retransmission (e.g., at 1144) of the first NOMA uplink transmission 1112. The third resource may be predefined and indicated to the first UE 1104 via the configuration information 1108.

Figure 20:
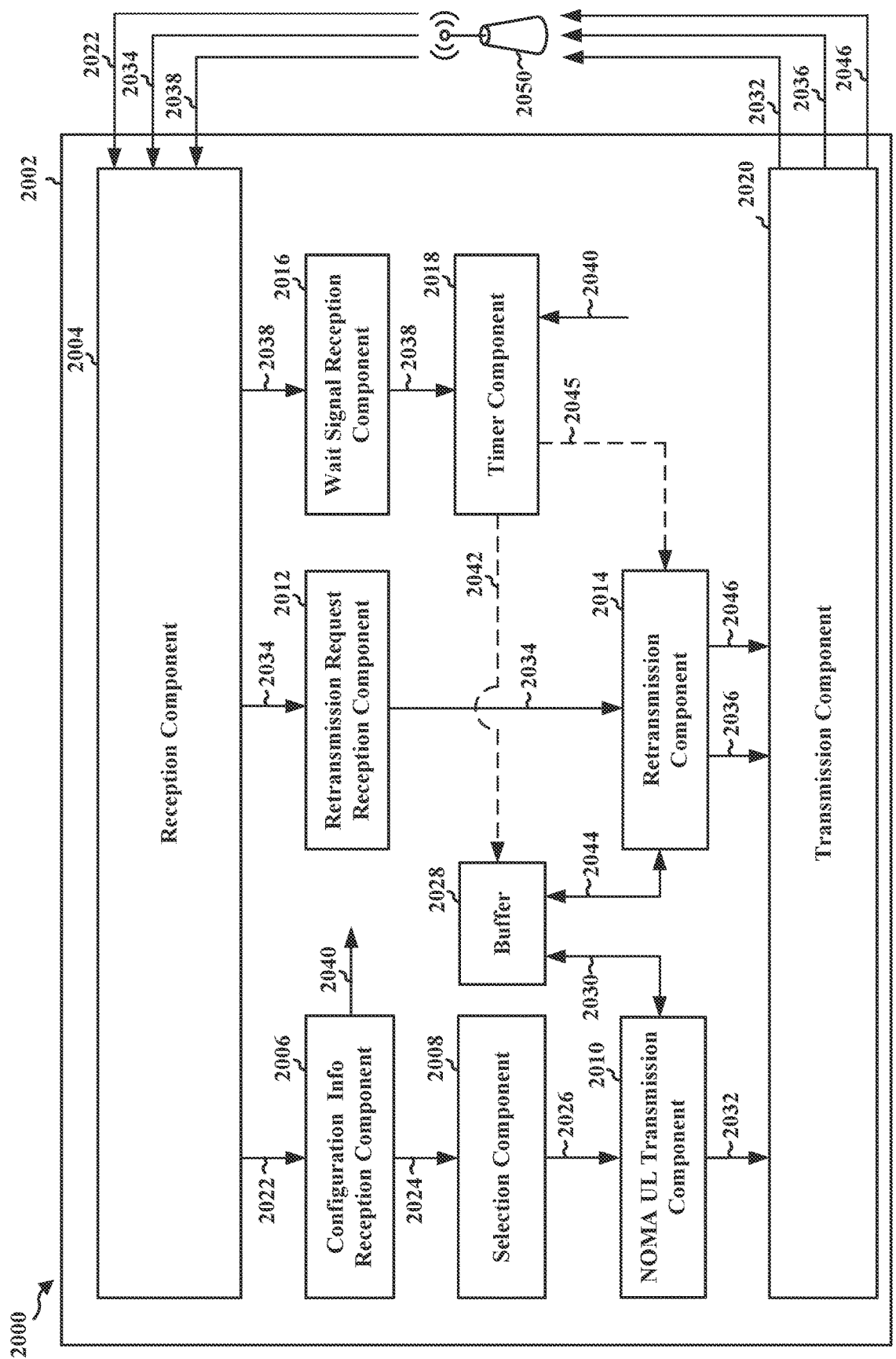
FIG. 20 is a conceptual data flow diagram illustrating the data flow between different means/components in an example apparatus.

FIG. 20 is a conceptual data flow diagram 2000 illustrating the data flow between different means/components in an example apparatus 2002. The apparatus may be a UE. The apparatus 2002 includes a reception component 2004 that receives one or more downlink transmissions (e.g., from the network node 2050).

The apparatus 2002 further includes a configuration information reception component 2006 that receives a configuration message 2022 (e.g., via the reception component 2004). In some aspects, the configuration message 2022 includes at least mapping information, the mapping information including at least one of a first plurality of demodulation reference signal ports or a first plurality of unique multiple access signatures associated with the first resource and at least one of a second plurality of demodulation reference signal ports or a second plurality of unique multiple access signatures associated with the second resource. In some aspects, the configuration message 2022 includes at least a period of time, where the period of time is to be used as a duration for a timer associated with a wait signal.

The apparatus 2002 further includes a selection component 2008 that selects at least one of the first plurality of demodulation reference signal ports or the first plurality of unique multiple access signatures based on a random selection or configuration information. The selection component 2008 may receive the configuration information via a message 2024 from the configuration information reception component 2006.

The apparatus 2002 further includes a NOMA uplink transmission component 2010 that transmits an uplink transmission 2032 (e.g., via the transmission component 2020) using a first resource of a non-orthogonal channel. The NOMA uplink transmission component 2010 may obtain one or more packets (e.g., data packets) to be included in the uplink transmission 2032 from a buffer 2028 via a data path 2030. The NOMA uplink transmission component 2010 may receive a message 2026 from the selection component indicating at least the first resource of the non-orthogonal channel The apparatus 2002 further includes a retransmission request reception component 2012 that receives a retransmission request 2034 for the uplink transmission (e.g., the uplink transmission 2032).

The apparatus 2002 further includes a retransmission component 2014 that retransmits the uplink transmission (e.g., the uplink transmission 2032) or a portion of the uplink transmission using a second resource of the non-orthogonal channel in response to the retransmission request 2034. For example, the retransmission component 2014 transmits an uplink transmission 2036 that is the same as the uplink transmission 2032. For example, the retransmission component 2014 may obtain one or more packets (e.g., data packets) included in the uplink transmission 2032 from the buffer 2028 via a data path 2044.

The apparatus 2002 further includes a wait signal reception component 2016 that receives a wait signal 2038 in response to the retransmission (e.g., the uplink transmission 2036) of the uplink transmission or the portion of the uplink transmission.

The apparatus 2002 further includes a timer component 2018 that starts a timer in response to the wait signal 2038. The timer component 2018 may receive a message 2040 from the configuration information reception component including the period of time to be used as a duration for the timer associated with the wait signal 2038.

In some aspects, the timer component 2018 clears the buffer 2028 that includes the uplink transmission (e.g., one or more packets in the uplink transmission 2032) if a second retransmission request is not received for the retransmission of the uplink transmission or the portion of the uplink transmission prior to an expiration of the timer. For example, the timer component 2018 may transmit a clear buffer signal 2042 to clear the buffer 2028. The buffer 2028 may discard the one or more packets transmitted in the uplink transmission 2032 in response to the clear buffer signal 2042.

In some aspects, the timer component 2018 may transmit a retransmission command 2045 that causes the retransmission component 2014 to retransmit the uplink transmission (e.g., the uplink transmission 2032) or the portion of the uplink transmission using a third resource of the non-orthogonal channel if a second retransmission request is received for the uplink transmission prior to an expiration of the timer. For example, the retransmission component 2014 may transmit an uplink transmission 2046 that is the same as the uplink transmission 2032. For example, the retransmission component 2014 may obtain one or more packets (e.g., data packets) included in the uplink transmission 2032 from the buffer 2028 via the data path 2044.

The apparatus 2002 further includes a transmission component 2020 that transmits one or more uplink transmissions (e.g., to the network node 2050).

The apparatus may include additional components that perform each of the blocks of the algorithm in the aforementioned flowcharts of FIGS. 18 and 19. As such, each block in the aforementioned flowcharts of FIGS. 18 and 19 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 21:
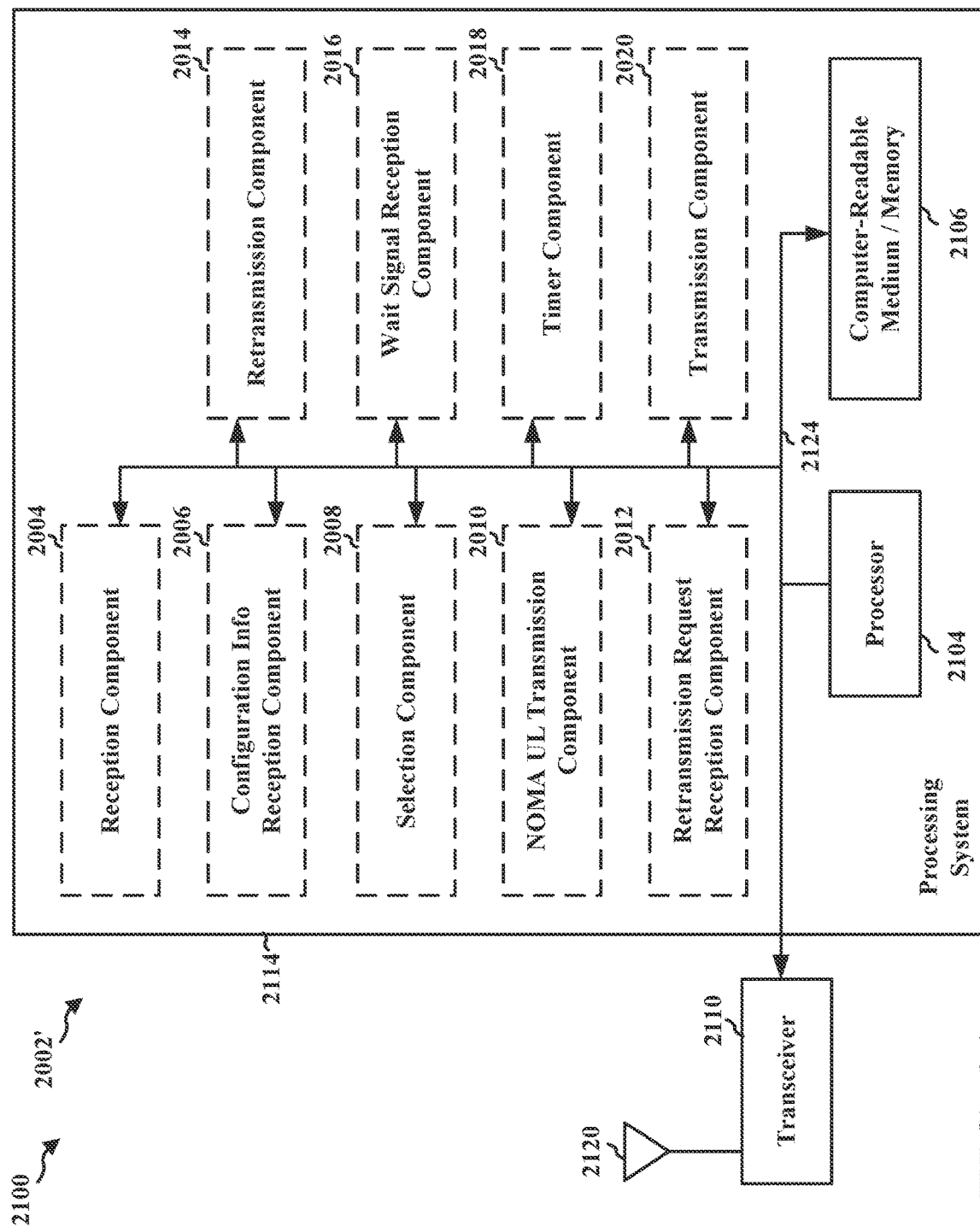
FIG. 21 is a diagram illustrating an example of a hardware implementation for an apparatus employing a processing system.

FIG. 21 is a diagram 2100 illustrating an example of a hardware implementation for an apparatus 2002' employing a processing system 2114. The processing system 2114 may be implemented with a bus architecture, represented generally by the bus 2124. The bus 2124 may include any number of interconnecting buses and bridges depending on the specific application of the processing system 2114 and the overall design constraints. The bus 2124 links together various circuits including one or more processors and/or hardware components, represented by the processor 2104, the components 2004, 2006, 2008, 2010, 2012, 2014, 2016, 2018, 2020, and the computer-readable medium/memory 2106. The bus 2124 may also link various other circuits such as timing sources, peripherals, voltage regulators, and power management circuits, which are well known in the art, and therefore, will not be described any further.

The processing system 2114 may be coupled to a transceiver 2110. The transceiver 2110 is coupled to one or more antennas 2120. The transceiver 2110 provides a means for communicating with various other apparatus over a transmission medium. The transceiver 2110 receives a signal from the one or more antennas 2120, extracts information from the received signal, and provides the extracted information to the processing system 2114, specifically the reception component 2004. In addition, the transceiver 2110 receives information from the processing system 2114, specifically the transmission component 2020, and based on the received information, generates a signal to be applied to the one or more antennas 2120. The processing system 2114 includes a processor 2104 coupled to a computer-readable medium/memory 2106. The processor 2104 is responsible for general processing, including the execution of software stored on the computer-readable medium/memory 2106. The software, when executed by the processor 2104, causes the processing system 2114 to perform the various functions described supra for any particular apparatus. The computer-readable medium/memory 2106 may also be used for storing data that is manipulated by the processor 2104 when executing software. The processing system 2114 further includes at least one of the components 2004, 2006, 2008, 2010, 2012, 2014, 2016, 2018, 2020. The components may be software components running in the processor 2104, resident/stored in the computer readable medium/memory 2106, one or more hardware components coupled to the processor 2104, or some combination thereof. The processing system 2114 may be a component of the UE 350 and may include the memory 360 and/or at least one of the TX processor 368, the RX processor 356, and the controller/processor 359. Alternatively, the processing system 2114 may be the entire UE (e.g., see 350 of FIG. 3).

In one configuration, the apparatus 2002/2002' for wireless communication includes means for transmitting an uplink transmission using a first resource of a non-orthogonal channel, means for receiving a retransmission request for the uplink transmission, means for retransmitting the uplink transmission or a portion of the uplink transmission using a second resource of the non-orthogonal channel in response to the retransmission request, means for receiving a wait signal in response to the retransmission of the uplink transmission or the portion of the uplink transmission, means for starting a timer in response to the wait signal, means for clearing a buffer that includes the uplink transmission if a second retransmission request is not received for the retransmission of the uplink transmission or the portion of the uplink transmission prior to an expiration of the timer, means for retransmitting the uplink transmission or the portion of the uplink transmission using a third resource of the non-orthogonal channel if a second retransmission request is received for the uplink transmission prior to an expiration of the timer, means for receiving a configuration message including at least mapping information, the mapping information including at least one of a first plurality of demodulation reference signal ports or a first plurality of unique multiple access signatures associated with the first resource and at least one of a second plurality of demodulation reference signal ports or a second plurality of unique multiple access signatures associated with the second resource, means for selecting at least one of the first plurality of demodulation reference signal ports or the first plurality of unique multiple access signatures based on a random selection or configuration information, and means for receiving a configuration message including at least a period of time.

The aforementioned means may be one or more of the aforementioned components of the apparatus 2002 and/or the processing system 2114 of the apparatus 2002' configured to perform the functions recited by the aforementioned means. As described supra, the processing system 2114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The aspects described herein may improve reliability of UE uplink retransmissions on a NOMA channel. For example, a UE may use a first resource (e.g., a first time-frequency resource) of a NOMA channel to transmit an initial NOMA uplink transmission and a second resource (e.g., a second time-frequency resource) of the NOMA channel for a retransmission of the initial NOMA uplink transmission. The second resource may be predefined and indicated to the UE via configuration information. In some examples, the second resource of the NOMA channel may provide a higher channel quality than the first resource of the NOMA channel, thereby improving the reliability of the retransmission.

Moreover, the aspects described herein may reduce signaling overhead by allowing retransmissions from some, but not all, of the UEs whose initial NOMA uplink transmissions cannot be decoded at a network entity. In these aspects, a network entity may perform a retrospective interference cancellation operation to decode a failed initial NOMA uplink transmission from one UE without a retransmission from that UE. For example, a network entity may perform a retrospective interference cancellation operation to decode a failed initial NOMA uplink transmission from one UE by using a successfully decoded retransmission of an initial NOMA uplink transmission from a different UE.

The following provides an overview of aspects of the present disclosure:

Aspect 1: An apparatus for wireless communication, comprising: a memory; and at least one processor coupled to the memory and configured to: receive a set of uplink transmissions from a set of user equipments (UEs) via a first resource of a non-orthogonal channel, wherein the apparatus is unable to decode the set of uplink transmissions; transmit a retransmission request to a subset of the set of UEs; receive a retransmission of a first uplink transmission in the set of uplink transmissions via a second resource of the non-orthogonal channel in response to the retransmission request; and decode a second uplink transmission in the set of uplink transmissions based on at least the retransmission of the first uplink transmission.

Aspect 2: The apparatus of aspect 1, wherein the at least one processor is further configured to: transmit a wait signal to a UE in the set of UEs associated with the second uplink transmission, wherein the wait signal serves as an indication to the UE to store the second uplink transmission for a period of time.

Aspect 3: The apparatus of aspect 1 or 2, wherein the at least one processor is further configured to: transmit configuration information including at least the period of time.

Aspect 4: The apparatus of any of aspects 1 through 3, wherein the at least one processor is further configured to: store uplink transmission information associated with the set of uplink transmissions, wherein the second uplink transmission is decoded based on the uplink transmission information and the retransmission of the first uplink transmission.

Aspect 5: The apparatus of any of aspects 1 through 4, wherein the retransmission request is transmitted in a control information message, wherein each of a set of bit positions in the control information message is associated with a different UE in the set of UEs.

Aspect 6: The apparatus of any of aspects 1 through 5, wherein the retransmission request is transmitted in a control information message, wherein each of a set of bit positions in the control information message is associated with at least one of a unique multiple access signature or a different demodulation reference signal port for the non-orthogonal channel.

Aspect 7: The apparatus of any of aspects 1 through 6, wherein the first resource of the non-orthogonal channel includes at least one of a first time resource or a first frequency resource, and wherein the second resource of the non-orthogonal channel includes at least one of a second time resource or a second frequency resource.

Aspect 8: The apparatus of any of aspects 1 through 7, wherein the first uplink transmission in the set of uplink transmissions is associated with at least one of a first demodulation reference signal port or a first unique multiple access signature and wherein the retransmission of the first uplink transmission is associated with at least one of a second demodulation reference signal port or a second unique multiple access signature.

Aspect 9: The apparatus of any of aspects 1 through 8, wherein the second demodulation reference signal port is associated with the first demodulation reference signal port and the second unique multiple access signature is associated with the first unique multiple access signature based on a preconfigured mapping.

Aspect 10: The apparatus of any of aspects 1 through 9, wherein the at least one processor is further configured to: determine that the retransmission of the first uplink transmission is associated with the first uplink transmission in the set of uplink transmissions based on at least one of the second demodulation reference signal port or the second unique multiple access signature and the preconfigured mapping.

Aspect 11: The apparatus of any of aspects 1 through 10, wherein the at least one processor is further configured to: transmit configuration information including at least mapping information, the mapping information including at least one of a first plurality of demodulation reference signal ports or a first plurality of unique multiple access signatures associated with the first resource and at least one of a second plurality of demodulation reference signal ports or a second plurality of unique multiple access signatures associated with the second resource.

Aspect 12: A method of wireless communication, comprising: receiving a set of uplink transmissions from a set of user equipments (UEs) via a first resource of a non-orthogonal channel, wherein the apparatus is unable to decode the set of uplink transmissions; transmitting a retransmission request to a subset of the set of UEs; receiving a retransmission of a first uplink transmission in the set of uplink transmissions via a second resource of the non-orthogonal channel in response to the retransmission request; and decoding a second uplink transmission in the set of uplink transmissions based on at least the retransmission of the first uplink transmission.

Aspect 13: The method of aspect 12, further comprising: transmitting a wait signal to a UE in the set of UEs associated with the second uplink transmission, wherein the wait signal serves as an indication to the UE to store the second uplink transmission for a period of time.

Aspect 14: The method of aspect 12 or 13, further comprising: transmitting configuration information including at least the period of time.

Aspect 15: The method of any of aspects 12 through 14, further comprising: storing uplink transmission information associated with the set of uplink transmissions, wherein the second uplink transmission is decoded based on the uplink transmission information and the retransmission of the first uplink transmission.

Aspect 16: The method of any of aspects 12 through 15, wherein the retransmission request is transmitted in a control information message, wherein each of a set of bit positions in the control information message is associated with a different UE in the set of UEs.

Aspect 17: The method of any of aspects 12 through 16, wherein the retransmission request is transmitted in a control information message, wherein each of a set of bit positions in the control information message is associated with at least one of a unique multiple access signature or a different demodulation reference signal port for the non-orthogonal channel.

Aspect 18: The method of any of aspects 12 through 17, wherein the first resource of the non-orthogonal channel includes at least one of a first time resource or a first frequency resource, and wherein the second resource of the non-orthogonal channel includes at least one of a second time resource or a second frequency resource.

Aspect 19: The method of any of aspects 12 through 18, wherein the first uplink transmission in the set of uplink transmissions is associated with at least one of a first demodulation reference signal port or a first unique multiple access signature and wherein the retransmission of the first uplink transmission is associated with at least one of a second demodulation reference signal port or a second unique multiple access signature.

Aspect 20: The method of any of aspects 12 through 19, wherein the second demodulation reference signal port is associated with the first demodulation reference signal port and the second unique multiple access signature is associated with the first unique multiple access signature based on a preconfigured mapping.

Aspect 21: The method of any of aspects 12 through 20, further comprising: determining that the retransmission of the first uplink transmission is associated with the first uplink transmission in the set of uplink transmissions based on at least one of the second demodulation reference signal port or the second unique multiple access signature and the preconfigured mapping.

Aspect 22: The method of any of aspects 12 through 21, further comprising: transmitting configuration information including at least mapping information, the mapping information including at least one of a first plurality of demodulation reference signal ports or a first plurality of unique multiple access signatures associated with the first resource and at least one of a second plurality of demodulation reference signal ports or a second plurality of unique multiple access signatures associated with the second resource.

Aspect 23: An apparatus for wireless communication, comprising: a memory; and at least one processor coupled to the memory and configured to: transmit an uplink transmission using a first resource of a non-orthogonal channel; receive a retransmission request for the uplink transmission; retransmit the uplink transmission or a portion of the uplink transmission using a second resource of the non-orthogonal channel in response to the retransmission request; and receive a wait signal in response to the retransmission of the uplink transmission or the portion of the uplink transmission.

Aspect 24: The apparatus of aspect 23, wherein the at least one processor is further configured to: start a timer in response to the wait signal; and clear a buffer that includes the uplink transmission if a second retransmission request is not received for the retransmission of the uplink transmission or the portion of the uplink transmission prior to an expiration of the timer.

Aspect 25: The apparatus of aspect 23 or 24, wherein the at least one processor is further configured to: start a timer in response to the wait signal; and retransmit the uplink transmission or the portion of the uplink transmission using a third resource of the non-orthogonal channel if a second retransmission request is received for the uplink transmission prior to an expiration of the timer.

Aspect 26: The apparatus of any of aspects 23 through 25, wherein the at least one processor is further configured to: receive a configuration message including at least mapping information, the mapping information including at least one of a first plurality of demodulation reference signal ports or a first plurality of unique multiple access signatures associated with the first resource and at least one of a second plurality of demodulation reference signal ports or a second plurality of unique multiple access signatures associated with the second resource.

Aspect 27: The apparatus of any of aspects 23 through 26, wherein the at least one processor is further configured to: select at least one of the first plurality of demodulation reference signal ports or the first plurality of unique multiple access signatures based on a random selection or configuration information.

Aspect 28: The apparatus of any of aspects 23 through 27, wherein the at least one processor is further configured to: receive a configuration message including at least a period of time, wherein the period of time is to be used as a duration for a timer associated with the wait signal.

Aspect 29: A method of wireless communication, comprising: transmitting an uplink transmission using a first resource of a non-orthogonal channel; receiving a retransmission request for the uplink transmission; retransmitting the uplink transmission or a portion of the uplink transmission using a second resource of the non-orthogonal channel in response to the retransmission request; and receiving a wait signal in response to the retransmission of the uplink transmission or the portion of the uplink transmission.

Aspect 30: The method of aspect 29, further comprising: receiving a configuration message including at least mapping information, the mapping information including at least one of a first plurality of demodulation reference signal ports or a first plurality of unique multiple access signatures associated with the first resource and at least one of a second plurality of demodulation reference signal ports or a second plurality of unique multiple access signatures associated with the second resource.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication, comprising:
a memory; and
at least one processor coupled to the memory and configured to:
receive a set of uplink transmissions from a set of user equipments (UEs) via a first resource of a non-orthogonal channel, wherein the apparatus is unable to decode the set of uplink transmissions;
transmit a retransmission request to a subset of the set of UEs;
transmit a wait signal to a UE in the set of UEs, wherein the wait signal serves as an indication to the UE to store a second uplink transmission for a period of time;
receive a retransmission of a first uplink transmission in the set of uplink transmissions via a second resource of the non-orthogonal channel in response to the retransmission request; and
decode the second uplink transmission in the set of uplink transmissions based on at least the retransmission of the first uplink transmission.

2. The apparatus of claim 1, wherein the at least one processor is further configured to:
transmit configuration information including at least the period of time.

3. The apparatus of claim 1, wherein the at least one processor is further configured to:
store uplink transmission information associated with the set of uplink transmissions, wherein the second uplink transmission is decoded based on the uplink transmission information and the retransmission of the first uplink transmission.

4. The apparatus of claim 1, wherein the retransmission request is transmitted in a control information message, wherein each of a set of bit positions in the control information message is associated with a different UE in the set of UEs.

5. The apparatus of claim 1, wherein the retransmission request is transmitted in a control information message, wherein each of a set of bit positions in the control information message is associated with at least one of a unique multiple access signature or a different demodulation reference signal port for the non-orthogonal channel.

6. The apparatus of claim 1, wherein the first resource of the non-orthogonal channel includes at least one of a first time resource or a first frequency resource, and wherein the second resource of the non-orthogonal channel includes at least one of a second time resource or a second frequency resource.

7. The apparatus of claim 1, wherein the first uplink transmission in the set of uplink transmissions is associated with at least one of a first demodulation reference signal port or a first unique multiple access signature and wherein the retransmission of the first uplink transmission is associated with at least one of a second demodulation reference signal port or a second unique multiple access signature.

8. The apparatus of claim 7, wherein the second demodulation reference signal port is associated with the first demodulation reference signal port and the second unique multiple access signature is associated with the first unique multiple access signature based on a preconfigured mapping.

9. The apparatus of claim 8, wherein the at least one processor is further configured to:
determine that the retransmission of the first uplink transmission is associated with the first uplink transmission in the set of uplink transmissions based on at least one of the second demodulation reference signal port or the second unique multiple access signature and the preconfigured mapping.

10. The apparatus of claim 1, wherein the at least one processor is further configured to:
transmit configuration information including at least mapping information, the mapping information including at least one of a first plurality of demodulation reference signal ports or a first plurality of unique multiple access signatures associated with the first resource and at least one of a second plurality of demodulation reference signal ports or a second plurality of unique multiple access signatures associated with the second resource.

11. A method of wireless communication, comprising:
receiving a set of uplink transmissions from a set of user equipments (UEs) via a first resource of a non-orthogonal channel, wherein the apparatus is unable to decode the set of uplink transmissions;
transmitting a retransmission request to a subset of the set of UEs;
transmitting a wait signal to a UE in the set of UEs, wherein the wait signal serves as an indication to the UE to store a second uplink transmission for a period of time;
receiving a retransmission of a first uplink transmission in the set of uplink transmissions via a second resource of the non-orthogonal channel in response to the retransmission request; and
decoding the second uplink transmission in the set of uplink transmissions based on at least the retransmission of the first uplink transmission.

12. The method of claim 11, further comprising:
transmitting configuration information including at least the period of time.

13. The method of claim 11, further comprising:
storing uplink transmission information associated with the set of uplink transmissions, wherein the second uplink transmission is decoded based on the uplink transmission information and the retransmission of the first uplink transmission.

14. The method of claim 11, wherein the retransmission request is transmitted in a control information message, wherein each of a set of bit positions in the control information message is associated with a different UE in the set of UEs.

15. The method of claim 11, wherein the retransmission request is transmitted in a control information message, wherein each of a set of bit positions in the control information message is associated with at least one of a unique multiple access signature or a different demodulation reference signal port for the non-orthogonal channel.

16. The method of claim 11, wherein the first resource of the non-orthogonal channel includes at least one of a first time resource or a first frequency resource, and wherein the second resource of the non-orthogonal channel includes at least one of a second time resource or a second frequency resource.

17. The method of claim 11, wherein the first uplink transmission in the set of uplink transmissions is associated with at least one of a first demodulation reference signal port or a first unique multiple access signature and wherein the retransmission of the first uplink transmission is associated with at least one of a second demodulation reference signal port or a second unique multiple access signature.

18. The method of claim 17, wherein the second demodulation reference signal port is associated with the first demodulation reference signal port and the second unique multiple access signature is associated with the first unique multiple access signature based on a preconfigured mapping.

19. The method of claim 18, further comprising:
determining that the retransmission of the first uplink transmission is associated with the first uplink transmission in the set of uplink transmissions based on at least one of the second demodulation reference signal port or the second unique multiple access signature and the preconfigured mapping.

20. The method of claim 11, further comprising:
transmitting configuration information including at least mapping information, the mapping information including at least one of a first plurality of demodulation reference signal ports or a first plurality of unique multiple access signatures associated with the first resource and at least one of a second plurality of demodulation reference signal ports or a second plurality of unique multiple access signatures associated with the second resource.

21. An apparatus for wireless communication, comprising:
a memory; and
at least one processor coupled to the memory and configured to:
transmit an uplink transmission using a first resource of a non-orthogonal channel;
receive a retransmission request for the uplink transmission;
retransmit the uplink transmission or a portion of the uplink transmission using a second resource of the non-orthogonal channel in response to the retransmission request; and
receive a wait signal in response to the retransmission of the uplink transmission or the portion of the uplink transmission, wherein the wait signal serves as an indication to store the uplink transmission for a period of time.

22. The apparatus of claim 21, wherein the at least one processor is further configured to:
start a timer in response to the wait signal; and
clear a buffer that includes the uplink transmission if a second retransmission request is not received for the retransmission of the uplink transmission or the portion of the uplink transmission prior to an expiration of the timer.

23. The apparatus of claim 21, wherein the at least one processor is further configured to:
start a timer in response to the wait signal; and
retransmit the uplink transmission or the portion of the uplink transmission using a third resource of the non-orthogonal channel if a second retransmission request is received for the uplink transmission prior to an expiration of the timer.

24. The apparatus of claim 21, wherein the at least one processor is further configured to:
receive a configuration message including at least mapping information, the mapping information including at least one of a first plurality of demodulation reference signal ports or a first plurality of unique multiple access signatures associated with the first resource and at least one of a second plurality of demodulation reference signal ports or a second plurality of unique multiple access signatures associated with the second resource.

25. The apparatus of claim 24, wherein the at least one processor is further configured to:
select at least one of the first plurality of demodulation reference signal ports or the first plurality of unique multiple access signatures based on a random selection or configuration information.

26. The apparatus of claim 21, wherein the at least one processor is further configured to:
receive a configuration message including at least a period of time, wherein the period of time is to be used as a duration for a timer associated with the wait signal.

27. A method of wireless communication, comprising:
transmitting an uplink transmission using a first resource of a non-orthogonal channel;
receiving a retransmission request for the uplink transmission;
retransmitting the uplink transmission or a portion of the uplink transmission using a second resource of the non-orthogonal channel in response to the retransmission request; and
receiving a wait signal in response to the retransmission of the uplink transmission or the portion of the uplink transmission, wherein the wait signal serves as an indication to store the uplink transmission for a period of time.

28. The method of claim 27, further comprising:
receiving a configuration message including at least mapping information, the mapping information including at least one of a first plurality of demodulation reference signal ports or a first plurality of unique multiple access signatures associated with the first resource and at least one of a second plurality of demodulation reference signal ports or a second plurality of unique multiple access signatures associated with the second resource.

* * * * *